US008403816B2

(12) United States Patent
Park

(10) Patent No.: US 8,403,816 B2
(45) Date of Patent: *Mar. 26, 2013

(54) TREADMILL WITH AUTOMATIC SPEED CONTROL AND CONTROL MODULE OF THE SAME

(75) Inventor: Jae-Sang Park, Gyeonggi-do (KR)

(73) Assignee: Dasan Rnd Co., Ltd., Gyeonggi-do (KR)

( * ) Notice: Subject to any disclaimer, the term of this patent is extended or adjusted under 35 U.S.C. 154(b) by 387 days.

This patent is subject to a terminal disclaimer.

(21) Appl. No.: 12/738,176
(22) PCT Filed: Jan. 31, 2008
(86) PCT No.: PCT/KR2008/000579
§ 371 (c)(1),
(2), (4) Date: Apr. 15, 2010
(87) PCT Pub. No.: WO2009/051298
PCT Pub. Date: Apr. 23, 2009

(65) Prior Publication Data
US 2010/0222182 A1  Sep. 2, 2010

(30) Foreign Application Priority Data

| Oct. 16, 2007 | (KR) | 10-2007-0104222 |
| Dec. 12, 2007 | (KR) | 10-2007-0129436 |
| Dec. 12, 2007 | (KR) | 10-2007-0129438 |
| Dec. 12, 2007 | (KR) | 10-2007-0129439 |
| Dec. 24, 2007 | (KR) | 10-2007-0136452 |
| Dec. 24, 2007 | (KR) | 10-2007-0136453 |
| Dec. 24, 2007 | (KR) | 10-2007-0136455 |
| Dec. 24, 2007 | (KR) | 10-2007-0136456 |
| Dec. 24, 2007 | (KR) | 10-2007-0136457 |
| Dec. 24, 2007 | (KR) | 10-2007-0136458 |
| Dec. 24, 2007 | (KR) | 10-2007-0136459 |
| Dec. 24, 2007 | (KR) | 10-2007-0136460 |
| Dec. 24, 2007 | (KR) | 10-2007-0136462 |

(51) Int. Cl.
*A63B 22/00* (2006.01)
*A63B 71/00* (2006.01)
(52) U.S. Cl. ............................................. 482/54; 482/8
(58) Field of Classification Search .................. 482/1–9, 482/54
See application file for complete search history.

(56) References Cited

U.S. PATENT DOCUMENTS 4,708,337 A * 11/1987 Shyu .............................. 482/54
5,314,391 A *  5/1994 Potash et al. .................... 482/7
(Continued)

FOREIGN PATENT DOCUMENTS

| KR | 1020010107801 | 12/2001 |
| KR | 1020070015687 |  2/2007 |

(Continued)

OTHER PUBLICATIONS

International Search Report issued in PCT/KR2008/000579, mailed on Jul. 14, 2008 (7 pages).

(Continued)

*Primary Examiner* — Stephen Crow
(74) *Attorney, Agent, or Firm* — Osha Liang LLP

(57) ABSTRACT

A treadmill includes a body having a belt for supporting an exerciser, an exerciser detecting portion installed in a predetermined area of the body to detect movement of the exerciser, a driving motor coupled to the body to drive the belt, a control portion for generating a first control signal for adjusting a rotation speed of the driving motor based on a signal received from the exerciser detecting portion, a motor driving portion for adjusting the rotation speed of the driving motor according to the first control signal received from the control portion, and an electrical braking portion for reducing the rotation speed of the driving motor. The treadmill quickly follows acceleration or deceleration of an exerciser; provides an experience as if the exerciser is exercising on the ground, thereby improve an exerciser's exercising experience; accepts various exercising patterns of an exerciser; resolves a problem in that a motor driving portion is tripped due to a load caused by quick deceleration; and preprocesses measured values of an exerciser's position to resolve a problem in that a speed of a belt cannot be controlled due to measurement errors contained in measured values.

7 Claims, 20 Drawing Sheets

U.S. PATENT DOCUMENTS

| | | | |
|---|---|---|---|
| 5,368,532 A * | 11/1994 | Farnet | 482/5 |
| 5,489,250 A * | 2/1996 | Densmore et al. | 482/54 |
| 5,800,314 A * | 9/1998 | Sakakibara et al. | 482/54 |
| 6,152,854 A * | 11/2000 | Carmein | 482/4 |
| 6,733,423 B1 * | 5/2004 | Chang | 482/54 |
| 6,997,855 B2 * | 2/2006 | Choy | 482/54 |
| 7,101,319 B1 * | 9/2006 | Potts | 482/54 |
| 7,862,483 B2 * | 1/2011 | Hendrickson et al. | 482/54 |
| 8,007,407 B2 * | 8/2011 | Richter | 482/54 |
| 2010/0210418 A1 * | 8/2010 | Park | 482/4 |
| 2010/0210419 A1 * | 8/2010 | Park | 482/7 |
| 2010/0222182 A1 * | 9/2010 | Park | 482/54 |

FOREIGN PATENT DOCUMENTS

| | | |
|---|---|---|
| KR | 1020070081476 | 8/2007 |
| KR | 1020070082277 A | 8/2007 |
| KR | 1020070082929 A | 8/2007 |

OTHER PUBLICATIONS

Written Opinion issued in PCT/KR2008/000579, mailed on Jul. 14, 2008 (5 pages).

English Translation for Korean Patent Application with Publication No. 10-2001-0107801; Publication Date: Dec. 7, 2001 (10 pages).

English Translation for Korean Patent Application with Publication No. 10-2007-0015687; Publication Date: Feb. 6, 2007 (17 pages).

English Translation for Korean Patent Application with Publication No. 10-2007-0081476; Publication Date: Aug. 17, 2007 (19 pages).

English Translation for Korean Patent Application with Publication No. 10-2007-0082277; Publication Date: Aug. 21, 2007 (20 pages).

English Translation for Korean Patent Application with Publication No. 10-2007-0082929; Publication Date: Aug. 23, 2007 (29 pages).

* cited by examiner

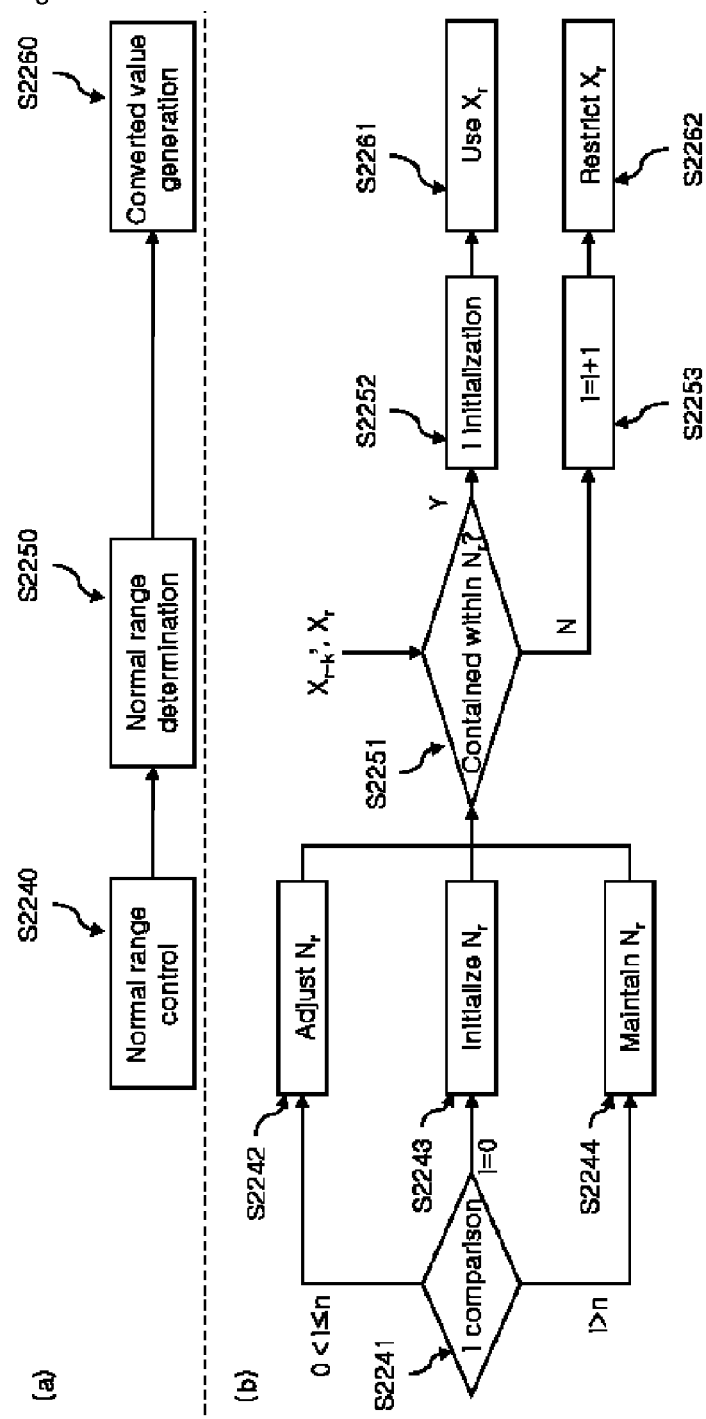
Fig. 16
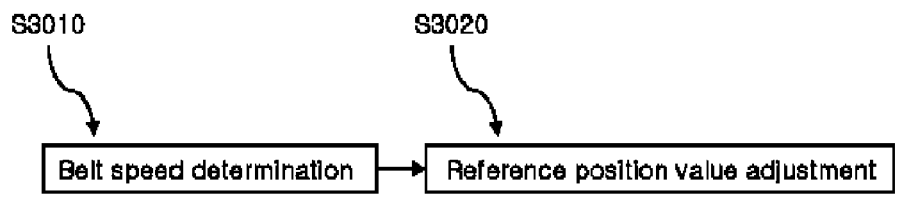
[Fig. 17]

TREADMILL WITH AUTOMATIC SPEED CONTROL AND CONTROL MODULE OF THE SAME

CLAIM FOR PRIORITY

This application claims priority to Korean Patent Application No. 10-2007-0104222 filed on Oct. 16, 2007, Korean Patent Application No. 10-2007-0129436 filed on Dec. 12, 2007, Korean Patent Application No. 10-2007-0129438 filed on Dec. 12, 2007, Korean Patent Application No. 10-2007-0129439 filed on Dec. 12, 2007, Korean Patent Application No. 10-0136452 filed on Dec. 24, 2007, Korean Patent Application No. 10-2007-0136453 filed on Dec. 24, 2007, Korean Patent Application No. 10-2007-0136455 filed on Dec. 24, 2007, Korean Patent Application No, 10-2007-0136456 filed on Dec. 24, 2007, Korean Patent Application No. 10-2007-0136457 filed on Dec. 24, 2007, Korean Patent Application No. 10-2007-0136458 filed on Dec. 24, 2007, Korean Patent Application No. 10-2007-0136459 filed on Dec. 24, 2007, Korean Patent Application No. 10-2007-0136460 filed on Dec. 24, 2007, and Korean Patent Application No. 10-2007-0136462 filed on Dec. 24, 2007 in the Korean Intellectual Property Office (KIPO), the entire contents of which are hereby incorporated by reference.

BACKGROUND

1. Technical Field

The present invention relates to a treadmill, and more particularly, to a treadmill with an automatic speed control function in which a speed of a rotating belt is automatically controlled according to an exercising speed and an exercising state of an exerciser.

2. Description of the Related Art

In a conventional treadmill, in order to control a speed of a rotating belt, an exerciser has to manipulate a speed control button while walking or running and has to passively follow the manually controlled speed of the rotating belt. Therefore, such a conventional treadmill does not provide a good exercising experience to an exerciser and is also difficult to realize a natural feeling that an exerciser can have while walking or running on the ground.

In order to overcome the above problems, techniques for measuring a position of an exerciser to automatically control a speed of a rotating belt have been developed. For example, Korean Patent No. 10-0398330 discloses a treadmill which measures a position of an exerciser using an ultrasonic sensor arranged below a control panel to locate an exerciser in a central region of the treadmill belt. The treadmill accelerates the rotating belt speed to move the exerciser back to the central region if the exerciser is ahead of the central region, and the treadmill decelerates the belt speed to return an exercise to the central region if the exerciser is behind the central region.

The treadmill disclosed in Korean Patent No. 10-0398330 performs acceleration or deceleration when a position of the exerciser is within a certain range from the central region, but the treadmill cannot handle various situations such as quick deceleration when an exerciser desires to abruptly stop while running at a high speed.

In addition, when a quick deceleration occurs, an overload occurs in a motor driving portion, and the motor driving portion stops driving the motor to protect itself. Thus, a conventional treadmill cannot execute a quick deceleration.

Also, a conventional treadmill performs a deceleration at a fixed slow speed, independently of a driving speed, within a range of a deceleration which does not exceed an allowable range of a motor driving portion, and performs an emergency stop operation of the motor driving portion using a natural friction force which works on a belt and a driving motor.

Also, since an abrupt deceleration during exercise can cause an exerciser to fall due to inertia and potential injury risks, a conventional treadmill has implemented a slow deceleration or a deceleration using a natural friction force.

For the foregoing reasons, an exerciser who exercises on a conventional treadmill has a different feeling from what he/she has while walking or running on the actual ground. Further, such a conventional treadmill cannot effectively implement various exercising patterns of an exerciser.

In order to improve an overall exercise experience and to cope with various exercising patterns of an exerciser, a treadmill needs to rapidly follow acceleration and deceleration of an exerciser, but a conventional treadmill cannot perform quick deceleration and thus cannot provide a satisfactory automatic speed control function.

In the treadmill disclosed in Korean Patent No. 10-0398330 which measures a position of an exerciser by an ultrasonic sensor in order to control a speed of a belt to locate an exerciser in a central region, a measured value of an exerciser's position received from an ultrasonic sensor may contain erroneous values. Therefore, it is difficult to implement an automatic speed control function using only a technique for measuring an exerciser's position by an ultrasonic sensor in a treadmill.

In addition, measured values received from an ultrasonic sensor can be distorted due to various ambient noise, and undesired measured values, for example, a position value of an arm or a leg, may be obtained while an exerciser walks or runs. Such signal distortion and undesired measured values make it difficult for a treadmill to automatically control a speed of a belt.

Korean Patent Publication Nos. 10-2007-0015687, 10-2007-0081476, 10-2007-0082277, and 10-2007-0082929 disclose techniques and mechanisms in which load sensors are arranged below front and rear portions of a belt, measured values obtained by load sensors are used to calculate an exerciser's position, and a speed of a rotating belt is controlled based on a difference between a calculated exerciser's position and a reference position.

However, the above-described techniques using load sensors have a problem in that a cycle of a load that is applied to a load sensor depends on a speed of an exerciser, and a cycle of a load of when an exerciser runs at a highest speed is 2 or 3 times per second. This makes it very difficult to smoothly control the belt speed.

Also, a position of an exerciser's foot continuously varies due to a movement of the belt even at a moment that an exerciser's foot pushes the belt, and the frequency with which the exerciser's feet make contact with the belt when an exerciser walks on the belt is not equal to that when an exerciser runs on the belt. Thus, it is difficult to accurately calculate a position of an upper body of an exerciser or the center of gravity.

In addition, the above-mentioned Korean Patent Publications have not mentioned a control method for coping with various exercising patterns of an exerciser, such as quick acceleration or quick deceleration, and so it is difficult to automatically control the belt speed only using a difference between an exerciser's position and a reference position in a manner that provides satisfactory automatic speed control.

SUMMARY

It is an object of the present invention to resolve a problem in that, in a conventional treadmill, an exercising experience is unsatisfactory since an exerciser passively exercises on a treadmill and the feeling of exercising on the ground is not realized.

It is another object of the present invention to resolve a problem in that a conventional treadmill does not quickly follow acceleration and deceleration of an exerciser.

It is still another object of the present invention to resolve a problem in that a conventional treadmill does not accept various exercising patterns of an exerciser.

It is yet still another object of the present invention to resolve a problem in that, in a conventional treadmill, a motor driving portion does not endure an overload caused by quick deceleration.

It is yet still another object of the present invention to resolve a problem in that a conventional treadmill cannot control a speed of a belt due to measurement errors contained in measured values of an exerciser's position.

In order to achieve the above objects, one aspect of the present invention provides a treadmill, comprising: a body having a belt for supporting an exerciser; an exerciser detecting portion installed in a predetermined area of the body to detect movement of the exerciser; a driving motor coupled to the body to drive the belt; a control portion for generating a first control signal for adjusting a rotation speed of the driving motor based on a signal received from the exerciser detecting portion; a motor driving portion for adjusting the rotation speed of the driving motor according to the first control signal received from the control portion; and an electrical braking portion for reducing the rotation speed of the driving motor.

Preferably, in the treadmill, in order to reduce the rotation speed of the driving motor, the motor driving portion generates a first braking torque, and the electrical braking portion generates a second braking torque.

Preferably, in the treadmill, the electrical braking portion generates the second braking torque when a provision braking torque by the first control signal is equal to or greater than the first braking torque.

Preferably, in the treadmill, the second braking torque is equal to or greater than a difference between the provision braking torque and the first braking torque.

Preferably, in the treadmill, the electrical braking torque comprises a switching portion which operates to generate the second braking torque when the provision braking torque is equal to or greater than the first braking torque.

Preferably, in the treadmill, the electrical braking torque comprises a switching portion which operates when a voltage of regenerative energy flowing into the motor driving portion from the driving motor is equal to or more than a predetermined reference in case of decreasing the rotation speed of the driving motor.

Preferably, in the treadmill, the switching portion operates by a second control signal transmitted from the control portion.

Preferably, in the treadmill, the electrical braking portion comprises a switching portion which operates when a voltage applied between both output terminals of a converting portion of the motor driving portion is equal to or more than a predetermined reference.

Preferably, in the treadmill, the electrical braking torque comprises a braking resistor which converts regenerative energy flowing into the motor driving portion from the driving motor into heat in case of decreasing the rotation speed of the driving motor.

Preferably, in the treadmill, both ends of the braking resistor are electrically connected to both output terminals of the converting portion of the motor driving portion, respectively.

Preferably, in the treadmill, one end of the braking resistor is electrically connected to one end of a switching portion which operates when a voltage of the regenerative energy is equal to or more than a predetermined reference.

Preferably, in the treadmill, the electrical braking torque transfers at least a part of regenerative energy flowing into the motor driving portion from the driving motor to a power supplying portion for supplying electrical power to the motor driving portion in case of decreasing the rotation speed of the driving motor.

Preferably, in the treadmill, the electrical braking portion comprises a switching portion which operates when a voltage of the regenerative energy is equal to or more than a predetermined reference.

Preferably, in the treadmill, the control portion comprises a pre-processing portion for generating a converted value used to generate the first control signal by using a measured value corresponding to the signal transmitted from the exerciser detecting portion.

Preferably, in the treadmill, the pre-processing portion generates the converted value by comparing the measured value to a past value of an at least first most recent or earlier previous unit time from a current unit time.

Preferably, in the treadmill, the control portion comprises a reference position generating portion for generating a reference position value which represents a reference position from the exerciser detecting portion for acceleration and deceleration of the driving motor.

Preferably, in the treadmill, the control portion comprises a driving command portion which receives the reference position value from the reference position generating portion, generates the first control signal and transmits the first control signal to the motor driving portion.

Preferably, in the treadmill, the reference position generating portion varies the reference position value by a predetermined criterion.

Preferably, in the treadmill, the reference position generating portion varies the reference position value corresponding to a speed of the belt.

Preferably, in the treadmill, the reference position generating portion adjusts the reference position value to be short from the exerciser detecting portion if the speed of the belt is fast, and adjusts the reference position value to be far from the exerciser detecting portion if the speed of the belt is slow.

Preferably, in the treadmill, the reference position generating portion decreases the reference position value if the speed of the belt is fast and increases the reference position value if the speed of the belt is slow.

In order to achieve the above objects, another aspect of the present invention provides a treadmill, comprising: a body having a belt for supporting an exerciser; an exerciser detecting portion which detects movement of the exerciser and is installed in a predetermined area of the body at the height of equal to or more than 50 cm and equal to or less than 150 cm from a top surface of the belt; a driving motor coupled to the body to drive the belt; a control portion for generating a control signal for adjusting a rotation speed of the driving motor based on a signal received from the exerciser detecting portion; and a motor driving portion for adjusting the rotation speed of the driving motor according to the control signal received from the control portion.

Preferably, in the treadmill, the exerciser detecting portion is installed at the height of equal to or less than 70 cm and equal to or less than 110 cm from the top surface of the belt.

Preferably, in the treadmill, the control portion comprises a pre-processing portion for generating a converted value used to generate the control signal by using a measured value corresponding to the signal transmitted from the exerciser detecting portion.

Preferably, in the treadmill, the exerciser detecting portion comprises an ultrasonic sensor which has a measuring cycle of equal to or more than 4 Hz and equal to or less than 100 Hz.

Preferably, in the treadmill, a radiation angle of the ultrasonic sensor is within about 25°.

Preferably, the treadmill further comprises an electrical braking portion for decreasing a rotation speed of the driving motor.

Preferably, the treadmill further comprises a regenerative energy processing portion for processing regenerative energy flowing into the motor driving portion from the driving motor when the driving motor is braked.

Preferably, in the treadmill, the reference position generating portion varies the reference position value based on a predetermined criterion.

One aspect of the present invention provides a control module for a treadmill, comprising: a base substrate with an electrical wire line formed therein; a control portion coupled to the base substrate and having a semiconductor circuit electrically connected to the electrical wire line; and a connecting terminal coupled to the base substrate and electrically connected to a motor driving portion for driving a driving motor and an exerciser detecting portion for measuring a position of an exerciser, wherein the control portion adjusts a rotation speed of the driving motor based on a signal transmitted from the exerciser detecting portion and transmits a first control signal to the motor driving portion to provide an electrical braking torque to the driving motor in order to decelerate the driving motor.

Preferably, in the control module for the treadmill, the control portion comprises a pre-processing portion for generating a converted value used to generate the first control signal by using a measured value corresponding to the signal transmitted from the exerciser detecting portion.

Preferably, in the control module for the treadmill, the pre-processing portion comprises a data converting portion which compares a current measured value to a past value of an at least first most recent or earlier previous unit time from a current unit time to generate the converted value.

Preferably, in the control module for the treadmill, the control portion comprises a reference position generating portion for generating a reference position value which represents a reference position from the exerciser detecting portion for acceleration and deceleration of the driving motor.

Preferably, in the control module for the treadmill, the control portion comprises a driving command portion which receives the reference position value from the reference position generating portion, generates the first control signal and transmits the first control signal to the motor driving portion.

Preferably, in the control module for the treadmill, the reference position generating portion varies the reference position value by a predetermined criterion.

Preferably, in the control module for the treadmill, the reference position generating portion varies the reference position value corresponding to a rotation speed of the driving motor.

Preferably, in the control module for the treadmill, the reference position generating portion adjusts the reference position value to be short from the exerciser detecting portion if the rotation speed of the driving motor is fast, and adjusts the reference position value to be far from the exerciser detecting portion if the rotation speed of the driving motor is slow.

Preferably, in the control module for the treadmill, the reference position generating portion decreases the reference position value if the rotation speed of the driving motor is fast and increases the reference position value if the rotation speed of the driving motor is slow.

Preferably, the control module for the treadmill further comprises an electrical braking portion which is electrically connected to the motor driving portion and provides the electrical braking torque.

Preferably, in the control module for the treadmill, the electrical braking torque comprises a resistor, and the control module further includes a heat sink portion which is made of a metal to discharge heat generated in the resistor.

Preferably, in the control module for the treadmill, in order to decrease the rotation speed of the driving motor, the motor driving portion generates a first braking torque, and the electrical braking portion generates a second braking torque.

Preferably, in the control module for the treadmill, the electrical braking portion generates the second braking torque when the electrical braking torque is equal to or greater than the first braking torque.

Preferably, in the control module for the treadmill, the second braking torque is equal to or greater than a difference between the electrical braking torque and the first braking torque.

Preferably, in the control module for the treadmill, the electrical braking torque comprises a switching portion which operates when the electrical braking torque is equal to or greater than the first braking torque.

Preferably, in the control module for the treadmill, the switching portion operates by a second control signal transmitted from the control portion via an electrical braking portion connecting terminal which electrically connects the control portion and the electrical braking portion among the connecting terminals.

A treadmill according to the present invention quickly follows acceleration or deceleration of an exerciser and thus has an advantage of realizing a feeling like what an exerciser has while exercising on the ground to thereby improve an exerciser's exercising feeling.

The treadmill according to the present invention has an advantage of accepting various exercising patterns of an exerciser.

The treadmill according to the present invention has an advantage of resolving a problem in that a motor driving portion is tripped due to a load caused by quick deceleration.

The treadmill according to the present invention adjusts a location of a sensor for measuring an exerciser's position and thus has an advantage of minimizing noise and measurement errors contained in measured signals.

The treadmill according to the present invention pre-processes measured values of an exerciser's position and thus has an advantage of resolving a problem in that a speed of a belt can not be controlled due to measurement errors contained in measured values.

BRIEF DESCRIPTION OF THE DRAWINGS

Example embodiments of the present invention will become more apparent by describing in detail example embodiments of the present invention with reference to the accompanying drawings, in which:

FIGS. 15 and 16 are flowcharts illustrating an operation of a data converting portion according to an exemplary embodiments of the present invention;

FIG. 17 is a flowchart illustrating an operation of a reference position generating portion according to an exemplary embodiment of the present invention;

DETAILED DESCRIPTION OF EXAMPLE EMBODIMENTS

Figure 1:
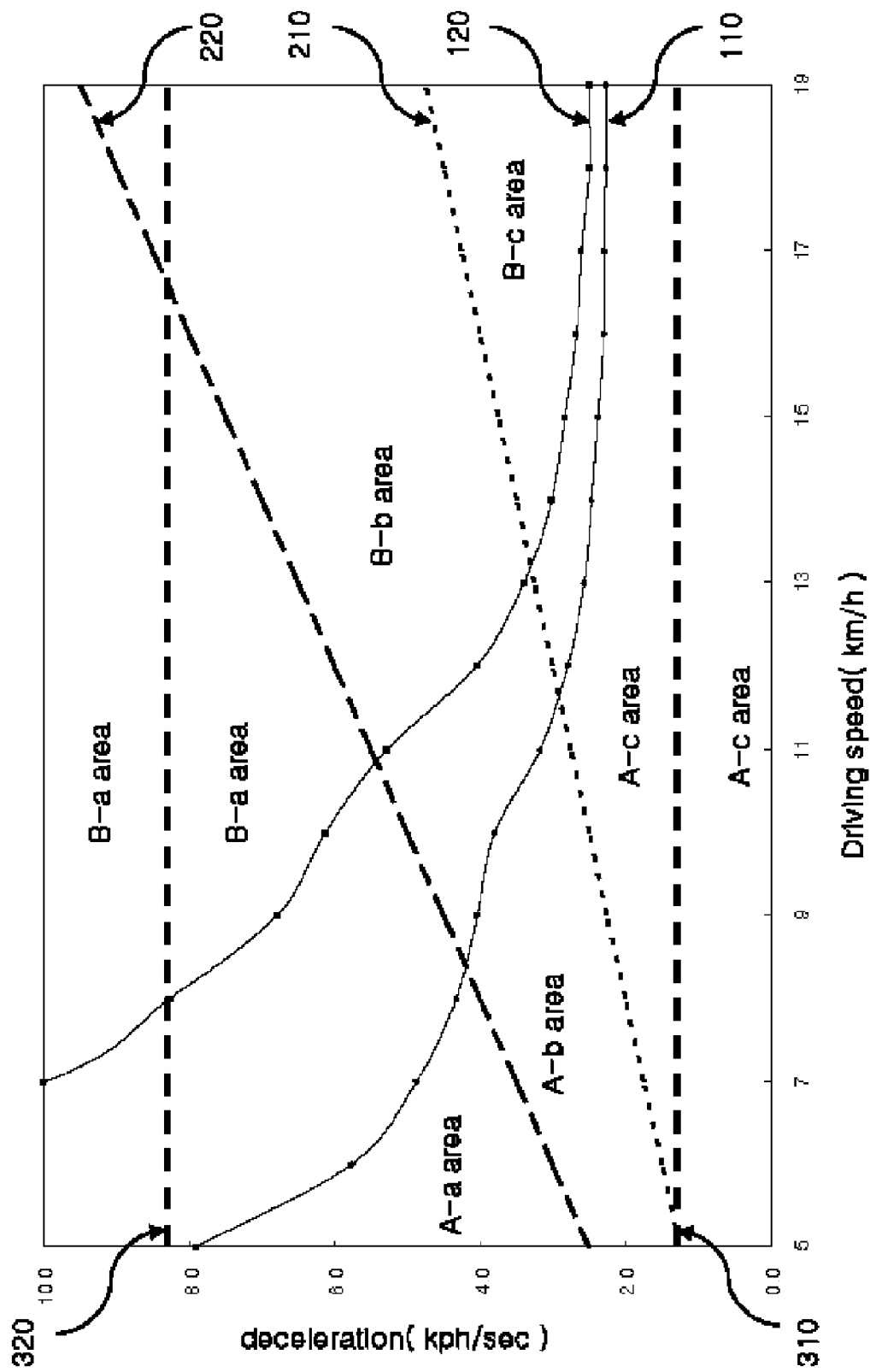
FIG. 1 is a measurement graph illustrating various load patterns of a treadmill according to the exemplary embodiment of the present invention.

While the invention is susceptible to various modifications and alternative forms, specific embodiments thereof are shown by way of example in the drawings and will herein be described in detail. However, it should be understood that there is no intent to limit the invention to the particular forms disclosed, but on the contrary, the invention is to cover all modifications, equivalents, and alternatives falling within the spirit and scope of the invention. In the drawings, like reference numerals denote like parts.

It will be understood that, although the terms first, second, etc. may be used herein to describe various elements, these elements should not be limited by these teens. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, components or a combination thereof these, but do not preclude the presence or addition of one or more other features, integers, steps, operations, elements, components, and/or groups thereof.

Hereinafter, a current value $X_r^T$ represents a current measured value $X_r$ or a current converted value $X_r'$, and is a representative term for describing current data in a stream of time. That is, a current value $X_r^T$ means data corresponding to a current time (e.g., current measuring cycle).

Similarly, a past value $X_{r\_i}^T$ (i=1, ... n) represents a past measured value (i=1, ... n) or a past converted value $X_{r\_i}'$ (i=1, ... n), and is a representative term for describing past data in a stream of time. That is, a past value $X_{r\_i}^T$ (i=1, ... n) means data corresponding to a past time (e.g., past measuring cycle).

Also, a data value $X_{r\_i}^\circ$ (i=0, ... , n) is a representative term for describing data containing a current value $X_r^T$ and a past value $X_{r\_i}^T$ (i=1, ... n).

Also, a belt speed, a driving belt speed, a rotation speed of a driving motor, and a driving speed have the same meaning, and so even though one term is described as an example, it may contain the meaning of other terms.

That is, a belt speed or a driving belt speed can be calculated by operating a rotation speed of a driving motor and a constant like a radius of a roller, can be calculated by using/operating a signal provided to a driving motor from a motor driving portion, or can be calculated by using a control signal (i.e., a first control signal) provided to a motor driving portion from a control portion.

A belt speed, a driving belt speed, a rotation speed of a driving motor may be directly measured by using a predetermined measuring means.

An exemplary embodiment of the present invention is described below in detail with reference to attached drawings.

FIG. 1 is a measurement graph illustrating various load patterns of a treadmill that can be used according to an exemplary embodiment of the present invention. The graph of FIG. 1 comparatively shows maximum allowable decelerations 110 and 120 of a motor driving portion that can be generated, due to a trip occurring in a motor driving portion, when braking a driving motor according to a driving speed of a belt if an electrical braking portion of the present invention is not provided. The graph of FIG. 1 also shows the target decelerations 210 and 220 used to provide an exerciser with an exercising feeling like what an exerciser has while exercising on an actual ground.

In additional, FIG. 1 shows problems which occur when a fixed small deceleration 310 and a fixed high deceleration 320 are provided according to a conventional art in a state that does not variably control a deceleration depending on a driving speed of a belt.

Since an experiment for performing quick deceleration while an exerciser exercises on a treadmill at a high speed is very risky, data in the graph of FIG. 1 are ones measured without an exerciser on the treadmill. The maximum allowable deceleration 110 is measured by using a motor driving portion with a capacity of 2.2 kW, and the maximum allowable deceleration 120 is measured by using a motor driving portion with a capacity of 3.7 kW.

The graph of FIG. 1 is first described below centering on the maximum allowable deceleration 110 measured using a motor driving portion with a capacity of 2.2 kW.

The maximum allowable deceleration 110 represents a maximum allowable load of a motor driving portion to brake a belt in a treadmill which does not have an electrical braking portion of the present invention. Areas A-a, A-b and A-c below a maximum allowable deceleration 110 line segment are deceleration areas containing an allowable load of a motor driving portion, and a deceleration in these areas can be performed only by a braking torque (first braking torque) of a motor driving portion itself without using the electrical braking portion of the present invention.

Areas B-a, B-b and B-c above the maximum allowable deceleration 110 line segment are deceleration areas which exceed an allowable load of a motor driving portion, and a deceleration in these areas needs a braking torque (second braking torque) provided by the electrical braking portion of the present invention.

As can be seen in the graph of FIG. 1, a maximum allowable deceleration depends on a driving speed of a belt.

In a low speed section in which a driving speed of a belt is 5 km/h, a maximum allowable deceleration is about 7.9 km/h per second, but in a high speed section in which a driving speed of a belt is 19 km/h, a maximum allowable deceleration is about 2.3 km/h per second.

Since a kinetic energy is larger as a driving speed of a belt is faster, a motor driving portion requires a larger load for braking, and so a maximum allowable deceleration at which a trip occurs in a motor driving portion becomes smaller. That is, if the electrical braking portion of the present invention is not provided, a larger deceleration is impossible as a driving speed of a belt is faster, and so it can be seen that there is a problem in that a belt which rotates at a speed of, for example, 19 km/h cannot perform a deceleration of more than 2.3 km/h per second.

In the present invention, it has been determined that an exerciser has a tendency to stop within a predetermined time regardless of a driving speed of a belt when an exerciser desires to stop while walking or running on a treadmill. Through an experiment for a relationship between a belt speed and a stop time using a plurality of subjects, it was determined that most exercisers feel satisfied when a stop time is in a range of 1.5 seconds to 5 seconds, preferably 2 seconds to 4 seconds.

It was also found through an experiment that a deceleration of an initial decelerating stage corresponds to a stop time which is a time taken for a belt which rotates at a certain speed to completely stop, and a deceleration tendency of an exerciser described above can be satisfied even when a stop time is varied during a deceleration.

Hereinafter, a stop time means the time taken for a belt to stop according to a deceleration of an exerciser.

A ratio between a belt driving speed and a stop time corresponds to an exerciser's desired deceleration, and so, in the graph of FIG. 1, target decelerations 210 and 220 with respect to a belt driving speed are respectively indicated by an upper target deceleration 220 corresponding to a stop time of 2 seconds and a lower target deceleration 210 corresponding to a stop time of 4 seconds.

Therefore, it is preferable that areas A-b and B-b between the lower and upper target deceleration 210 and 220 are set as target deceleration areas where a deceleration of a belt is controlled. In the exemplary embodiment of the present invention, a target deceleration is set to 3 seconds.

As can be seen in FIG. 1, the target decelerations 210 and 220 are increases as a belt driving speed increases, but in a conventional treadmill having no electrical braking portion as in the present invention, there is a problem in that the maximum allowable decelerations 110 and 220 decreases as a belt driving speed increases.

That is, it is necessary to use braking areas B-a, B-b and B-c where a braking torque (second braking torque) of the electrical braking portion is additionally provided since it is impossible to brake only by using a braking torque (first braking torque) of a motor driving portion itself. A relationship with the target decelerations 210 and 220 is described in more detail below.

Areas A-a and B-a defined by the upper target deceleration 220 are areas which may pose a risk to an exerciser due to a very fast deceleration, and, in these areas, there is a need for restricting a maximum deceleration.

Areas A-b and B-b defined by the upper target deceleration 220 and the lower target deceleration 210 are areas which provide a fast deceleration while not risking an exerciser. Particularly, the left area A-b defined by the maximum allowable deceleration 110 is an area in which a braking torque (first braking torque) of a motor driving portion is provided, and the right area B-b defined by the maximum deceleration 110 is an area which needs a braking torque (second braking torque) of an electrical braking portion.

Areas A-c and B-c defined by the lower target deceleration 210 are areas which provide a slower deceleration than the areas A-b and B-b but need a provision of a braking torque. Particularly, the left area A-c defined by the maximum allowable deceleration 110 is an area in which a braking torque (first braking torque) of a motor driving portion is provided, and the right area B-c defined by the maximum allowable deceleration 110 is an area which needs a braking torque (second braking torque) of the electrical braking portion.

Therefore, as can be seen in FIG. 1, an exerciser who requires the upper target deceleration 220 needs a braking torque (second braking torque) of the electrical braking portion at a belt speed of more than about 8 km/h, and an exerciser who requires the lower target deceleration 210 needs a braking torque (second braking torque) of the electrical braking portion at a belt speed of more than about 11.5 km/h.

An exerciser usually exercises on a treadmill at a speed of 7 km/h to 15 km/h, and there are exercisers who exercise on a treadmill even at a speed of more than 20 km/h.

A treadmill with only a braking torque (first braking torque) provided by a motor driving portion cannot realize a braking of a deceleration desired by an exerciser even in a general exercising speed range. Such a problem is resolved by providing the electrical braking portion of the present invention.

A conventional treadmill provides a fixed slow deceleration 310 at a driving speed of the whole section and so cannot provides a deceleration desired by an exerciser.

If a motor driving portion with a large capacitor of 3.7 kW is employed, then the maximum allowable deceleration 120 is increased compared to a motor driving portion with a capacity of 2.2 kW, but its increment rate is large in a low speed section and is small in a high speed section.

The maximum allowable deceleration 120 is increased with an opposite tendency to the target decelerations 210 and 220.

That is, the target deceleration requires a large deceleration at a high speed rather than a low speed, but even though a motor driving portion with a large capacity is employed, an incremented rate of a deceleration at a low speed is large, and an incremented rate of a deceleration at a high speed is small. Therefore, there is a problem in that it is impossible to provide a braking torque corresponding to a target deceleration. For such reasons, it is preferable to provide a braking torque (second braking torque) through the electrical braking portion of the present invention.

Also, if a fixed high speed deceleration 320 is provided at a driving speed of the whole section in order to overcome the above problem of a conventional treadmill, a large to deceleration with which an exerciser is difficult to cope is generated in a low speed section, whereby there is a problem in that such a deceleration is contained in the areas A-a and B-b which can cause potential risks to an exerciser.

For the foregoing reasons, in the exemplary embodiment of the present invention, a deceleration is preferably variably controlled corresponding to a driving speed of a belt.

By using a variable deceleration control method according to the present invention, the treadmill of the present invention variably controls a deceleration corresponding to a driving speed of a belt within the lower areas A-b and A-c defined by the target decelerations 210 and 220 and the maximum allowable decelerations 110 and 120, without using an electrical braking portion of the present invention, thereby significantly improving an exercising feeling compared to the conventional treadmill.

Such a variable deceleration control is provided within a range of the target deceleration and is performed by a deceleration control method which will be described with reference to FIGS. 10 to 20.

That is, a target deceleration means a deceleration which is on a target to improve an exerciser's exercising feeling corresponding to a rotation speed of a driving motor or a speed of a belt corresponding thereto, and a provision deceleration means a deceleration provided by a treadmill in consideration of various factors such as a position change rate of an exerciser within a range of the target deceleration. The provision deceleration corresponds to a first control signal provided to a motor driving portion 6000 from a control portion 7000.

Here, the target deceleration corresponds to a target braking torque, the provision deceleration corresponds to a provision braking torque, and the maximum allowable deceleration corresponds a braking torque (first braking torque) provided by the motor driving portion 6000.

Therefore, a braking torque (second braking torque) provided by the electrical braking portion 8000 of the present invention is generated such that a switching portion contained in to the electrical braking portion 8000, which will be described later, operates when the provision braking torque is equal to or more than the first braking torque.

Figure 2:
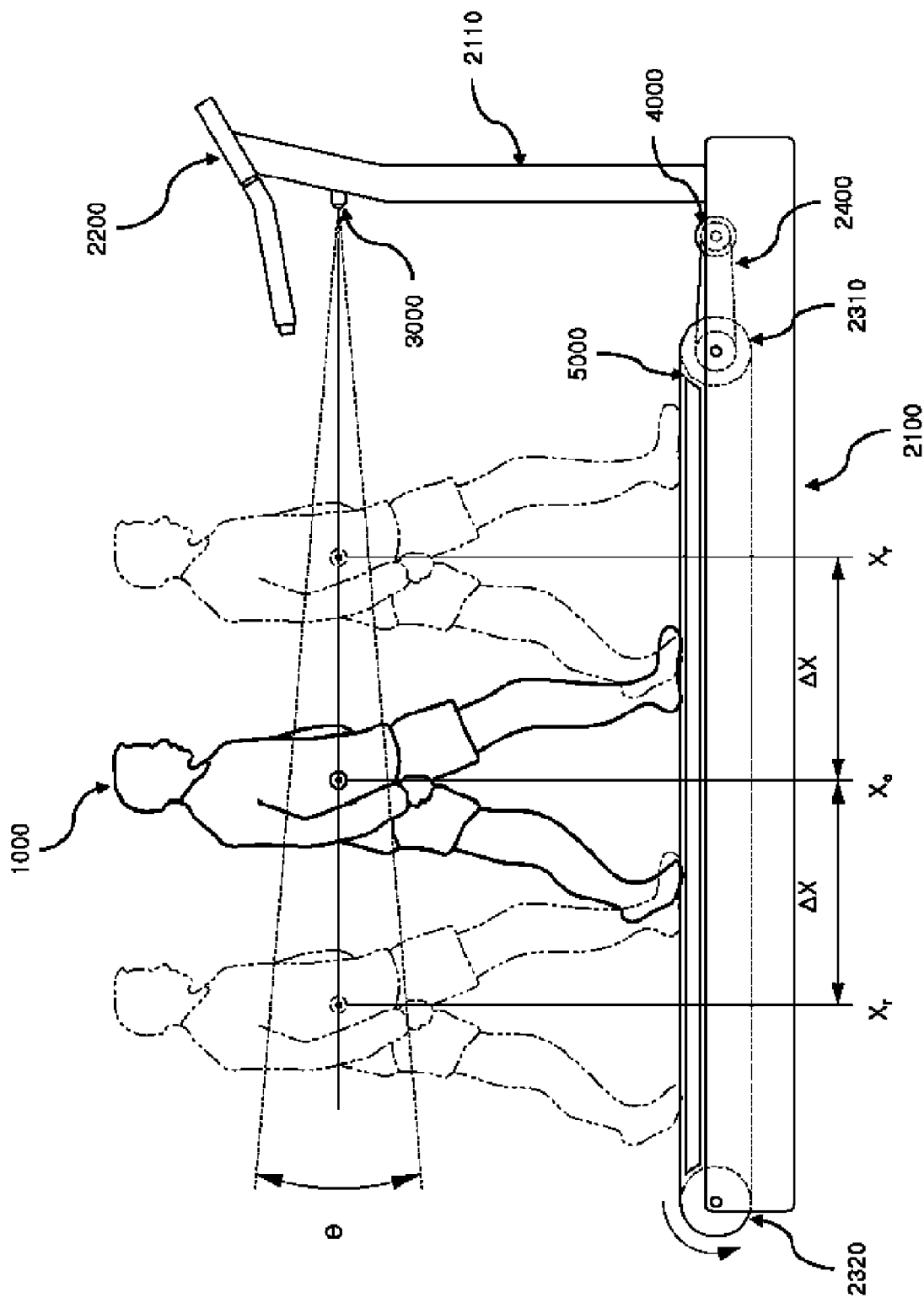
FIG. 2 is a side view illustrating the treadmill according to an exemplary embodiment of the present invention.
Figure 3:
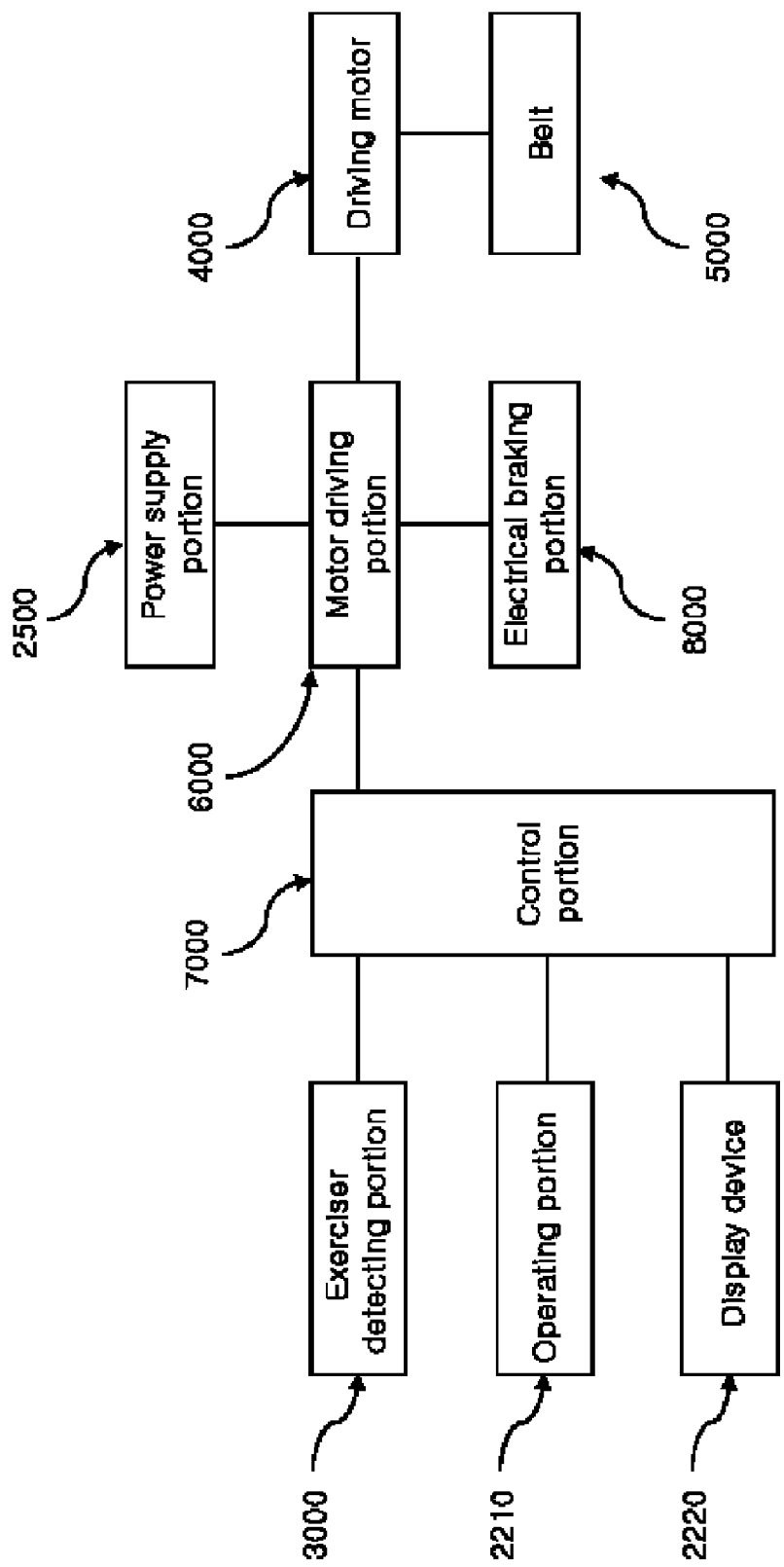
FIG. 3 is a block diagram illustrating the treadmill according to an exemplary embodiment of the present invention.

FIG. 2 is a side view illustrating the treadmill according to the exemplary embodiment of the present invention, and FIG. 3 is a block diagram illustrating the treadmill according to the exemplary embodiment of the present invention. The treadmill of the present invention comprises a body portion 2100, an exerciser detecting portion 3000, a driving motor 4000, a belt 5000, a motor driving portion 6000, and a control portion 7000.

The belt 5000 on which the exerciser 1000 walks or runs, the driving motor 4000 for driving the belt 5000, the motor driving portion 6000 for driving the driving motor, and the control portion 7000 are installed in the body portion 2100. The body portion 2100 can be variously configured depending on a design of a frame 2110.

The frame 2110 is arranged on one side of the body portion 2100, and a control panel 2200 which has an operating portion 2210 with buttons manipulated by the exerciser 1000 and a display device 2220 for displaying various information, and the exerciser detecting portion 3000 for detecting a position of the exerciser 1000 are arranged on one side of the frame 2110.

The belt 5000 is endlessly rotated by a pair of rollers 2310 and 2320 installed in the body portion 2100 and substantially supports the exerciser 1000. One roller 2310 of a pair of rollers 2310 and 2320 is engaged with the driving motor 4000 to receive torque from the driving motor 4000.

A torque transferring means 2400 arranged between the driving motor 4000 and the roller 2310 may be realized by a gear or a belt. Preferably, the torque transferring means 2400 is realized by a belt which has relatively small noise.

The exerciser detecting portion 3000 comprises a non-contact type sensor such as an optical sensor or an ultrasonic sensor and serves and measures a distance between the exerciser detecting portion 3000 and the exerciser 1000.

In the exemplary embodiment of the present invention, an ultrasonic sensor is used as the exerciser detecting portion 3000 since an optical sensor has a problem in that light emitted from an optical sensor may be absorbed by clothes of the exerciser 1000.

Such a non-contact type sensor measures a distance between the exerciser detecting portion 3000 and the exerciser 1000 by transmitting a signal at a predetermined interval and receiving a signal reflected from the exerciser 1000. For example, an ultrasonic sensor measures a distance between the exerciser detecting portion 3000 and the exerciser 1000 by calculating half of a reciprocating distance which is obtained by multiplying a speed at which a signal moves in the air and a time taken for a signal to return.

In case of an ultrasonic sensor, if a radiation angle ($\theta$) is small, a noise is small, and so a measurement error which may occur when the exerciser 1000 shakes an arm or a leg is reduced, but its price is high. To the contrary, if a radiation angle ($\theta$) is large, its price is low, but noise and a measurement error of the inexpensive sensor are increased.

In order to overcome the above problem, an ultrasonic sensor with a radiation angle ($\theta$) of equal to or less than about 25° is preferably used. In the exemplary embodiment of the present invention, a relatively cheap ultrasonic sensor with a radiation angle ($\theta$) of about 25° is used, and a noise and a measurement error resulting from a cheap sensor are compensated by a control method programmed in the control portion 7000 which will be described later.

The exerciser detecting portion 3000 is arranged on one side of the body portion 2100 at a height of 50 cm to 150 cm from a top surface of the belt 5000 in consideration of an adult average height and a detecting area. Preferably, the exerciser detecting portion 1000 is arranged at a height of 70 cm to 110 cm from a top surface of the endless belt 5000 in consideration of a height of a lower pelvis of when the exerciser lifts a leg and a height of an elbow of when the exerciser 1000 swings an arm in order to measure a position of an abdomen of the exerciser 1000.

In the exemplary embodiment of the present invention, a position of the exerciser 1000 is measured at a predetermined measuring cycle (for example, more than 10 Hz) by using an ultrasonic sensor as the exerciser detecting portion 3000. Since the exerciser 1000 swings an arm at a cycle of about 2 Hz to 3 Hz if he/she exercises at a fast speed, a position of an arm or knee of the exerciser 1000 other than an upper body of the exerciser 1000 may be contained in a measured value. In order to minimize this measurement error, an installation height of the exerciser detecting portion 3000 is adjusted, and the measured value is compensated by the control portion 7000.

Preferably, a measuring cycle of an ultrasonic sensor is greater than or equal to 4 Hz which is twice the variation cycle of a measured signal (for example, a position variation cycle of an upper body of the exerciser when the exerciser exercises) and less than or equal to 10 Hz in consideration of the maximum distance between the exerciser detecting portion 3000 and the exerciser 1000 which is about 1.5 m and a moving speed of a sonic wave. More preferably, a measuring cycle of an ultrasonic sensor is equal to or more than 6 Hz which is three times of a variation cycle of a measured signal.

When the exerciser 1000 rapidly runs to accelerate from a current speed, a current position $X_r$ of the exerciser 1000 is ahead of a reference position $X_0$, and the exerciser detecting portion 3000 transmits a signal corresponding to a current position of the exerciser 1000 measured or a current-position measured value $X_r$ corresponding thereto to the control portion 7000.

The control portion 7000 calculates a difference between the reference position value $X_0$ and the current-position measured value $X_r$ of the exerciser 1000 and transmits a first control signal corresponding to the difference to the motor driving portion 6000. The motor driving portion 6000 controls electrical power supplied from a power supply portion 2500 to increase a rotation speed of the driving motor 4000.

When a rotation speed of the driving motor 4000 is increased, a speed of the belt 5000 engaged with the driving motor 4000 is increased, which moves the exerciser 1000 backward in a direction of the reference position $X_0$.

Similarly, when the exerciser 1000 slowly runs to decelerate from a current speed, the current-position measured value $X_r$ of the exerciser 1000 is behind the reference position $X_0$, and the exerciser detecting portion 3000 transmits a signal corresponding to a current position of the exerciser 1000 measured or the current-position measured value $X_r$ corresponding thereto to the control portion 7000.

The control portion 7000 calculates a difference between the reference position value $X_0$ and the current-position measured value $X_r$ and transmits the first control signal corresponding to the difference to the motor driving portion 6000. The motor driving portion 6000 controls electrical power supplied from the power supply portion 2500 to decrease a rotation speed of the driving motor 4000.

When a rotation speed of the driving motor 4000 is decreased, a speed of the belt 5000 engaged with the driving motor 4000 is decreased, which moves the exerciser 1000 moves forward in a direction of the reference position $X_0$.

Accordingly, when the exerciser 1000 desires to accelerate or decelerate, a speed of the belt is automatically controlled so that the exerciser 1000 can be located in the reference position $X_0$.

A rotation speed of the driving motor 4000 is controlled by the motor driving portion 6000, and torque of the driving motor 4000 is transferred to the roller 2310 engaged with the belt 5000 through the torque transferring means 2400.

As the driving motor 4000, a direct current (DC) motor or an alternating current (AC) motor which is usually used may be used. In the exemplary embodiment of the present invention, an AC motor is used.

The motor driving portion 6000 is supplied with electrical power from the power supplying portion 2500 and controls a rotation speed of the driving motor 4000 in response to the first control signal transmitted from the control portion 7000.

The motor driving portion 6000 comprises either of an inverter and a converter depending on a kind of the driving motor 4000 as shown in FIGS. 4 to 9. In the exemplary embodiment of the present invention, an inverter for supplying an AC current to an AC motor is used.

In the exemplary embodiment of the present invention, the first control signal transmitted from the control portion 7000 to the motor driving portion 6000 is a frequency modulation (FM) signal, and in order to increase a speed of the driving motor 4000, the first control signal with a high frequency is generated.

An electrical braking portion 8000 provides a braking torque to the driving motor 4000 to decelerate the driving motor 4000 when the exerciser 1000 desires to decelerate while walking or running at a certain speed.

When the driving motor 4000 is an AC motor, the electrical braking portion 8000 may be variously realized by, for example, dynamic braking, regenerative braking, DC braking, single-phase braking, or reversed-phase braking. In the exemplary embodiment of the present invention, the electrical braking portion 8000 is realized by the dynamic braking and comprises a resistor which reduces kinetic energy of the driving motor 4000 to heat energy.

Even when the driving motor 4000 is a DC motor, the electrical braking portion 8000 may be realized by, for example, dynamic braking, regenerative braking, or reversed-phase braking.

At this point, since the motor driving portion 6000 has a braking means contained therein, the motor driving portion 6000 can provide a first braking torque to the driving motor 4000. However, a required braking torque exceeds the first braking torque when the electrical braking portion 8000 is not provided, a trip occurs, as shown in FIG. 1.

For the forgoing reason, the electrical braking portion 8000 generates a second braking torque to brake the driving motor 4000.

The present invention resolves the above-described problem such that only the first braking torque which is a part of a target braking torque is provided by the motor driving portion 6000 and the rest is provided by the electrical braking portion 8000.

The second braking torque of the electrical braking portion 8000 preferably corresponds to a part of the target braking torque which exceeds the first braking torque. That is, the target braking torque minus the first braking torque is the second braking torque.

Figure 4:
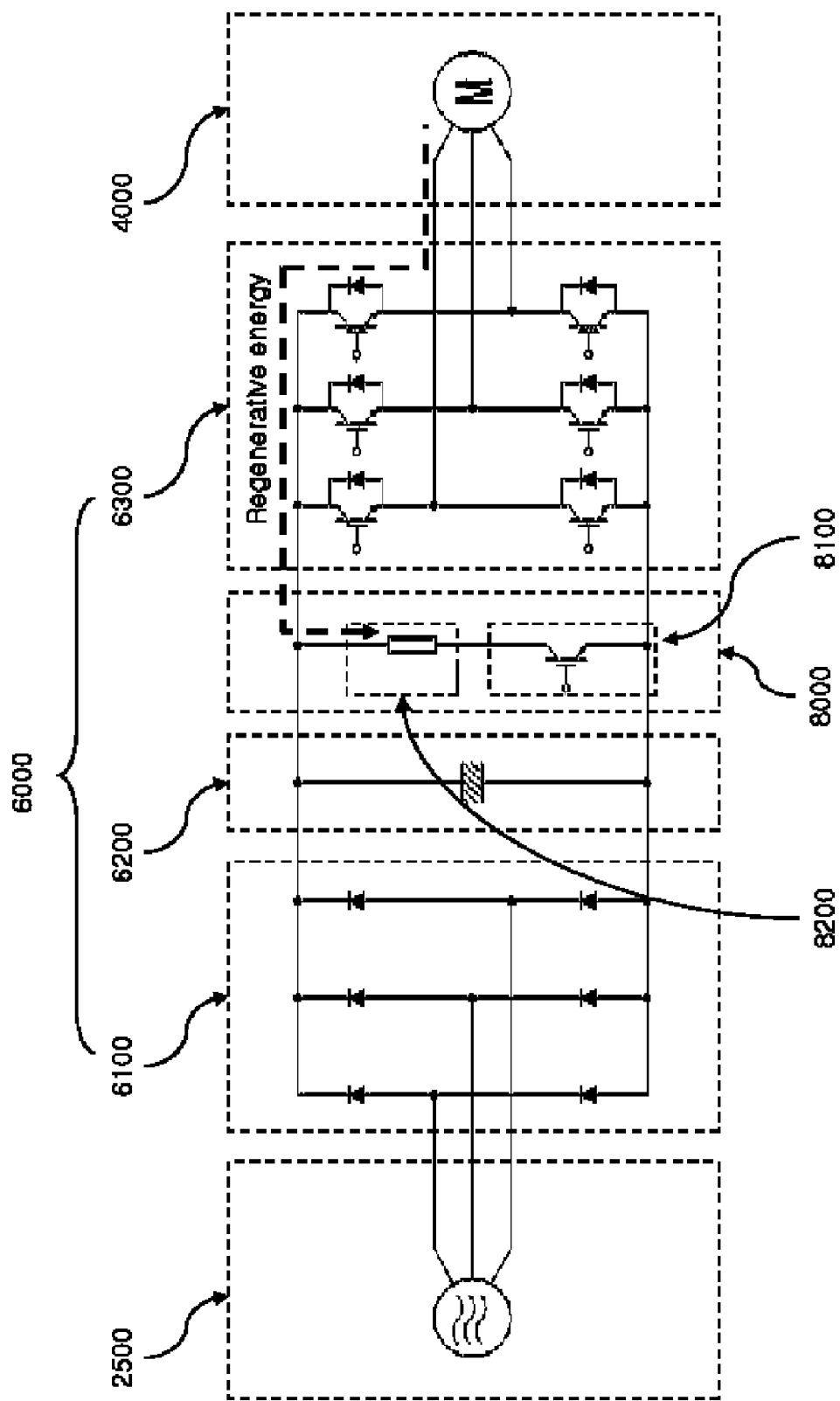
FIGS. 4 to 6 are various circuit diagrams illustrating an electrical braking method using an AC motor according to an exemplary embodiment of the present invention.
Figure 5:
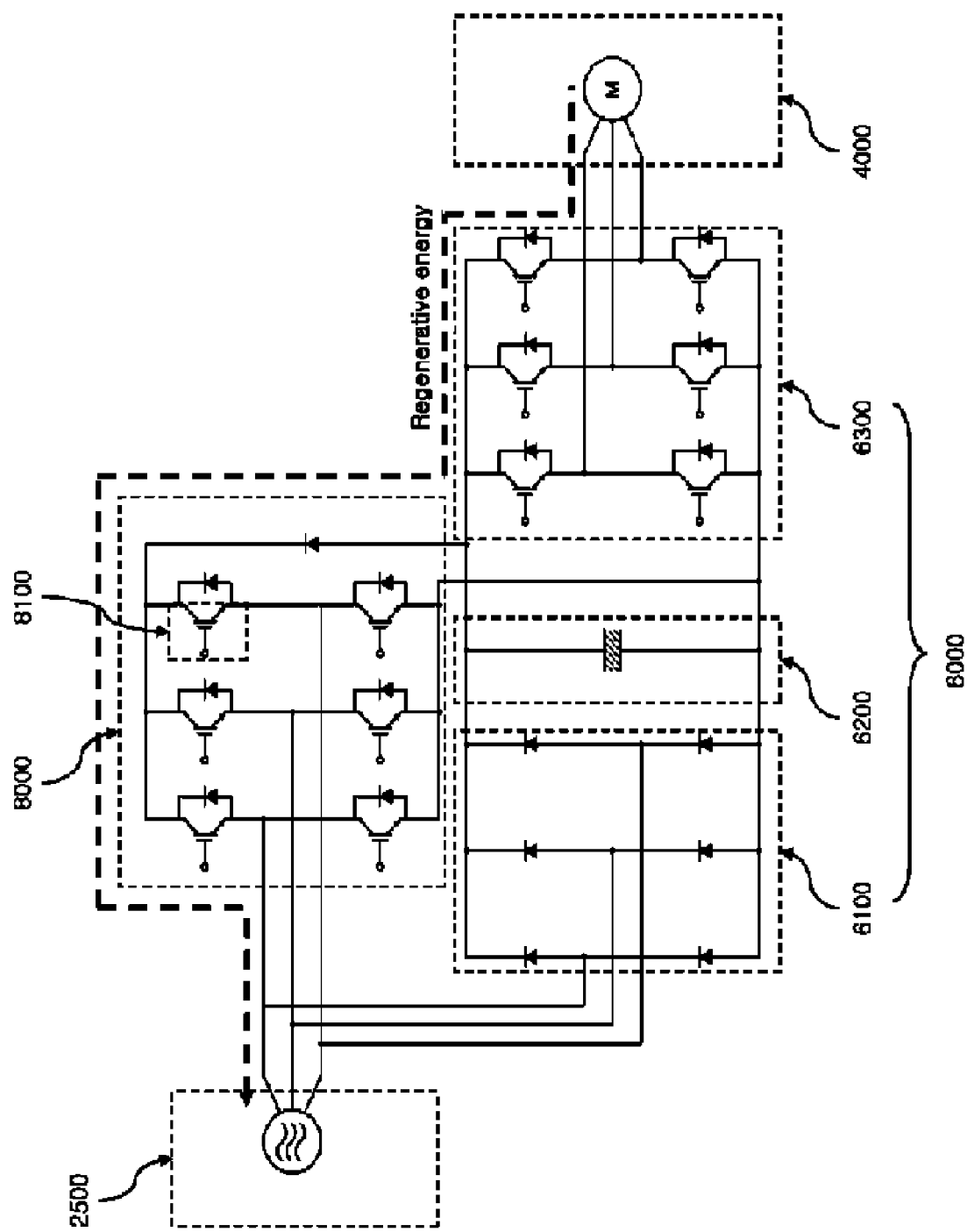
Figure 6:
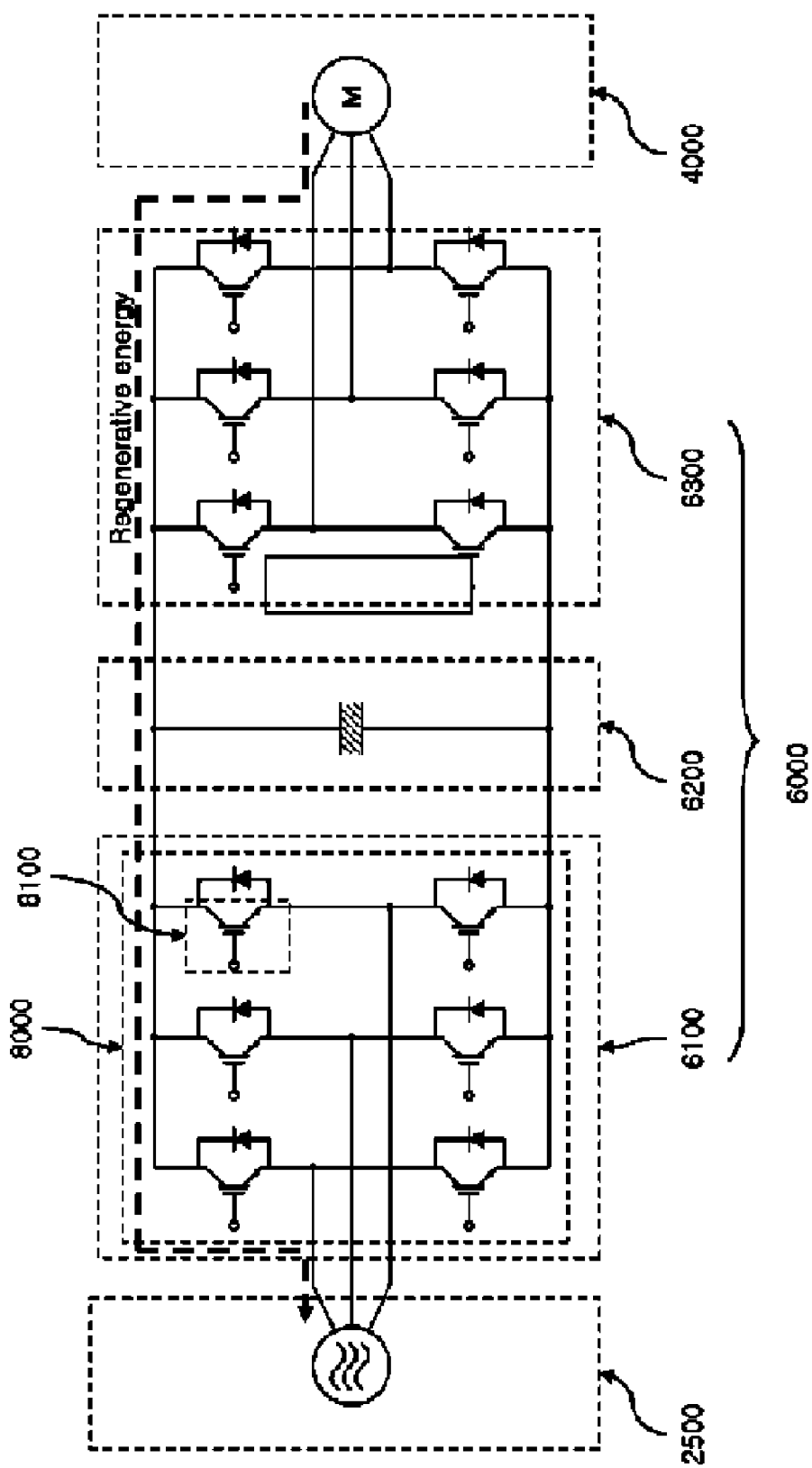

FIGS. 4 to 6 are various circuit diagrams illustrating electrical braking methods using an AC motor according to the exemplary embodiment of the present inventions. The power supplying portion 2500 for supplying an AC power, the driving motor 4000, the motor driving portion 6000 for controlling a speed of the driving motor 4000, and the electrical braking portion 8000 for providing a braking torque to the driving motor 4000 are shown in FIGS. 4 to 6, respectively.

In case where the power supplying portion 2500 supplies an AC power and the driving motor 4000 is an AC motor, the motor driving portion 6000 may comprise a typical inverter.

The inverter comprises a converting portion 6100 for rectifying an AC power supplied to the motor driving portion 6000, a DC smoothing portion 6200 for smoothing a voltage rectified by the converting portion 6100, and an inverting portion 6300 for frequency-modulating a DC power smoothed by the DC smoothing portion 6200 through the control portion 7000 and providing the frequency-modulated power to the driving motor 4000. The driving motor 4000 changes its rotation speed depending on a frequency.

When the first control signal for deceleration is transmitted to the motor driving portion 6000 from the control portion 7000 while the driving motor 4000 is rotating at a certain speed, the kinetic energy corresponding to a difference between a current speed and a decelerated speed flows to the motor driving portion 6000 from the driving motor 4000 as regenerative energy. Accordingly, the sum of a voltage of the power supplying portion 2500 and a voltage of the regenerative energy is applied between both output terminals of the converting portion 6100 or between both output terminals of the DC smoothing portion 6200.

FIG. 4 shows that in order to emit the regenerative energy from the motor driving portion 6000, the electrical braking portion 8000 uses a braking resistor 8200 to reduce the regenerative energy to the heat energy.

A switching portion 8100 of the electrical braking portion 8000 operates when a voltage applied between both output terminals of the converting portion 6100 or between both output terminals of the DC smoothing portion 6200 exceeds a predetermined reference voltage, that is, when a braking torque which exceeds a braking torque (first braking torque) of the motor driving portion 4000 is required, so that at least part of the regenerative energy which flows to the motor driving portion 6000 from the driving motor 4000 is emitted as the heat energy by the braking resistor 8200 which comprises a resistor connected between one end of the switching portion 8100 and one end of either the converting portion 6100 or the DC smoothing portion 6200.

The switching portion 8100 may be configured to operate in response to a second control signal transmitted from the control portion 7000.

The braking resistor 8200 is preferably designed, corresponding to a capacity of the motor driving portion 6000 and a load applied to the driving motor 4000, for example, a braking torque (first braking torque) of the motor driving portion 6000 and a maximum target braking torque which is a braking torque for providing the target decelerations 210 and 220 described in FIG. 1. In the exemplary embodiment of the present invention, the motor driving portion 6000 with a capacity of 2.2 KW and the braking resistor 8200 with a resistance of 50Ω are used.

FIGS. 5 and 6 show that the regenerative energy is sent back to the power supplying portion 2500 by the electrical braking portion 8000 for emitting the regenerative energy out of the motor driving portion 6000 or consuming it.

In FIG. 5, the electrical braking portion 8000 has a similar configuration to the inverting portion 6300 of the motor driving portion 6000 and is connected between both terminals of the converting portion 6100 or between both terminals of the DC smoothing portion 6200.

When a voltage applied between both terminals of the converting portion 6100 or between both terminals of the DC smoothing portion 6200 is more than a predetermined reference voltage due to the regenerative energy flowing into the motor driving portion 6000 from the driving motor 4000, that is, when a braking torque which exceeds a braking torque (first braking torque) of the motor driving portion 6000 is required, then the switching portion 8100 of the electrical braking portion 8000 operates to transfer the regenerative energy to the power supplying portion 2500.

At this time, a plurality of switching portions 8100 of the electrical braking portion 8000 are respectively controlled to synchronize a phase of the regenerative energy with an AC power of the power supplying portion 2500.

The switching portion 8100 may be configured to be operated by a circuit configuration of the inverter 6000 itself or to be operated by the second control signal transmitted from the control portion 7000.

In FIG. 6, the regenerative braking similar to that of FIG. 5 is used, but unlike that of FIG. 5, the switching portion 8100 is added to the converting portion 6100 to serve as the electrical braking portion 8000.

Diodes arranged in the converting portion 6100 or the electrical braking portion 8000 serve to rectify an AC power of the power supplying portion 2500 when a forward power is supplied to the driving motor 4000 from the power supplying portion 2500, and the switching portion 8100 serves to transfer the regenerative energy to the power supplying portion 2500 from the driving motor 4000. The diodes and the switching portion 8100 of FIG. 6 are the same in operating principle as those of FIG. 5.

The circuit configurations of FIGS. 4 to 6 according to the exemplary embodiment of the present invention are described below in more detail.

The power supplying portion 2500 supplies an AC power which is usually supplied to home.

The converting portion 6100 is configured by three pairs of diodes for rectifying an AC power supplied from the power supplying portion 2500, and outputs the rectified power through its output terminal.

The DC smoothing portion 6200 is configured by electrically connecting a capacitor to both output terminals of the converting portion 6100 in parallel and serves to smooth the rectified wave form.

The inverting portion 6300 is electrically connected to the output terminal of the DC smoothing portion 6200 and is configured by three pairs of insulated gate bipolar transistors (IGBTs) in which a switching element like a transistor and a diode are connected in parallel. A signal of a frequency modulator (not shown) for modulating a frequency corresponding to the first control signal transmitted from the control portion 7000 is input to gates of the IGBTs, and electrical power of a predetermined frequency is supplied to the driving motor 4000, thereby controlling a speed of the driving motor 4000.

In case of the DC braking, a braking torque can be provided by blocking a path of from the power supplying portion 2500 to the driving motor 4000 and then making a DC current to flow to a primary winding of the driving motor 4000 in the configurations of FIGS. 4 to 6.

In case of the single phase braking, a braking torque can be provided to the driving motor by connecting two terminals of a primary winding to each other and then applying a single-phase AC current between the connected terminal and the other terminal in the configurations of FIGS. 4 to 6.

In case of the reversed-phase braking, a braking torque can be provided to the driving motor 4000 by operating the IGBTs of the inverting portion 6300 to adjust a phase in the configurations of FIGS. 4 to 6.

Here, the electrical braking portion 8000 serves to emit the regenerative energy out of the motor driving portion 6000 or consume it and also serves to provide a braking torque of an opposite direction to a forward torque of the driving motor 4000.

Figure 7:
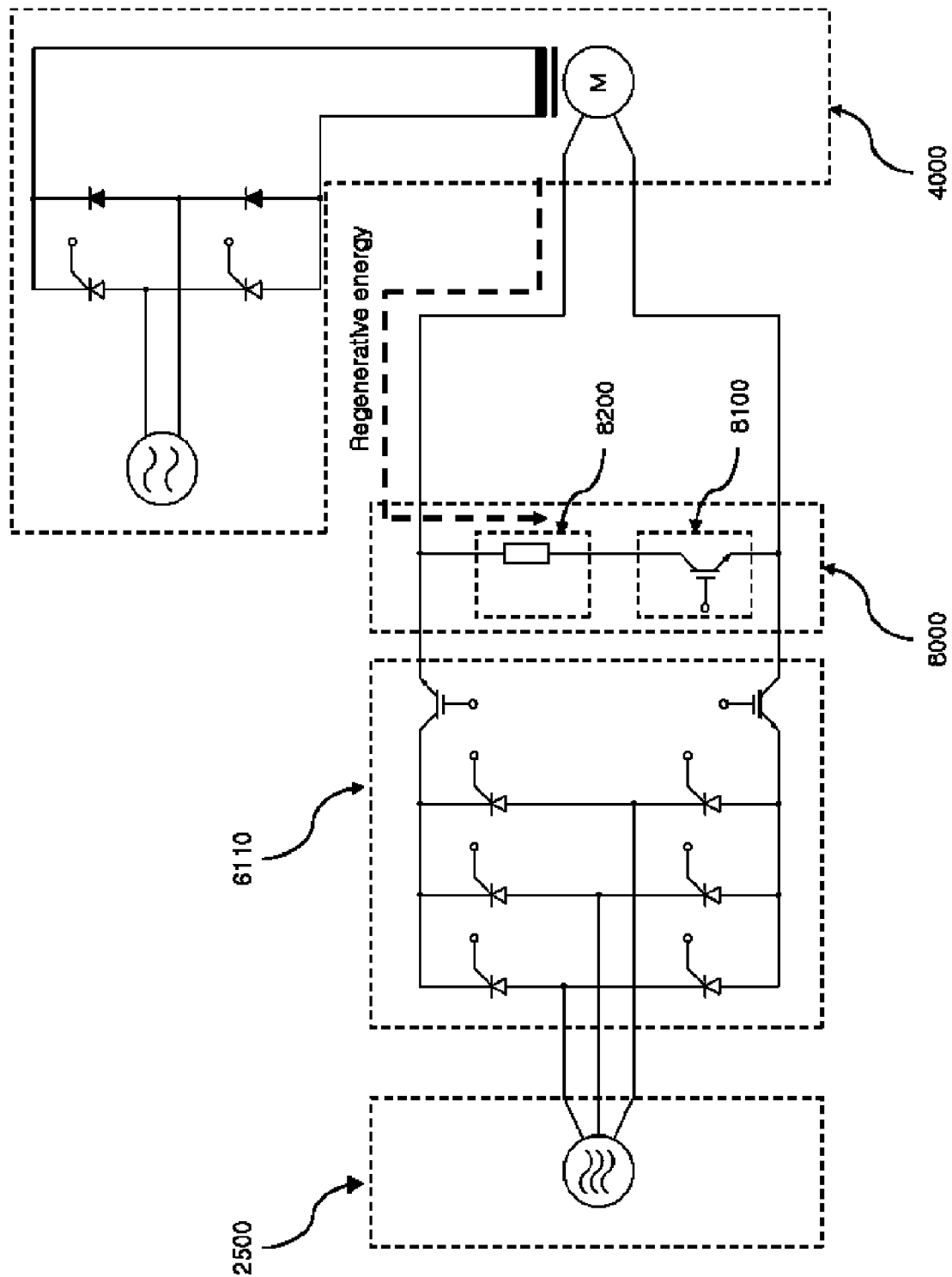
FIGS. 7 to 9 are various circuit diagrams illustrating electrical braking methods using a DC motor according to an exemplary embodiment of the present invention.
Figure 8:
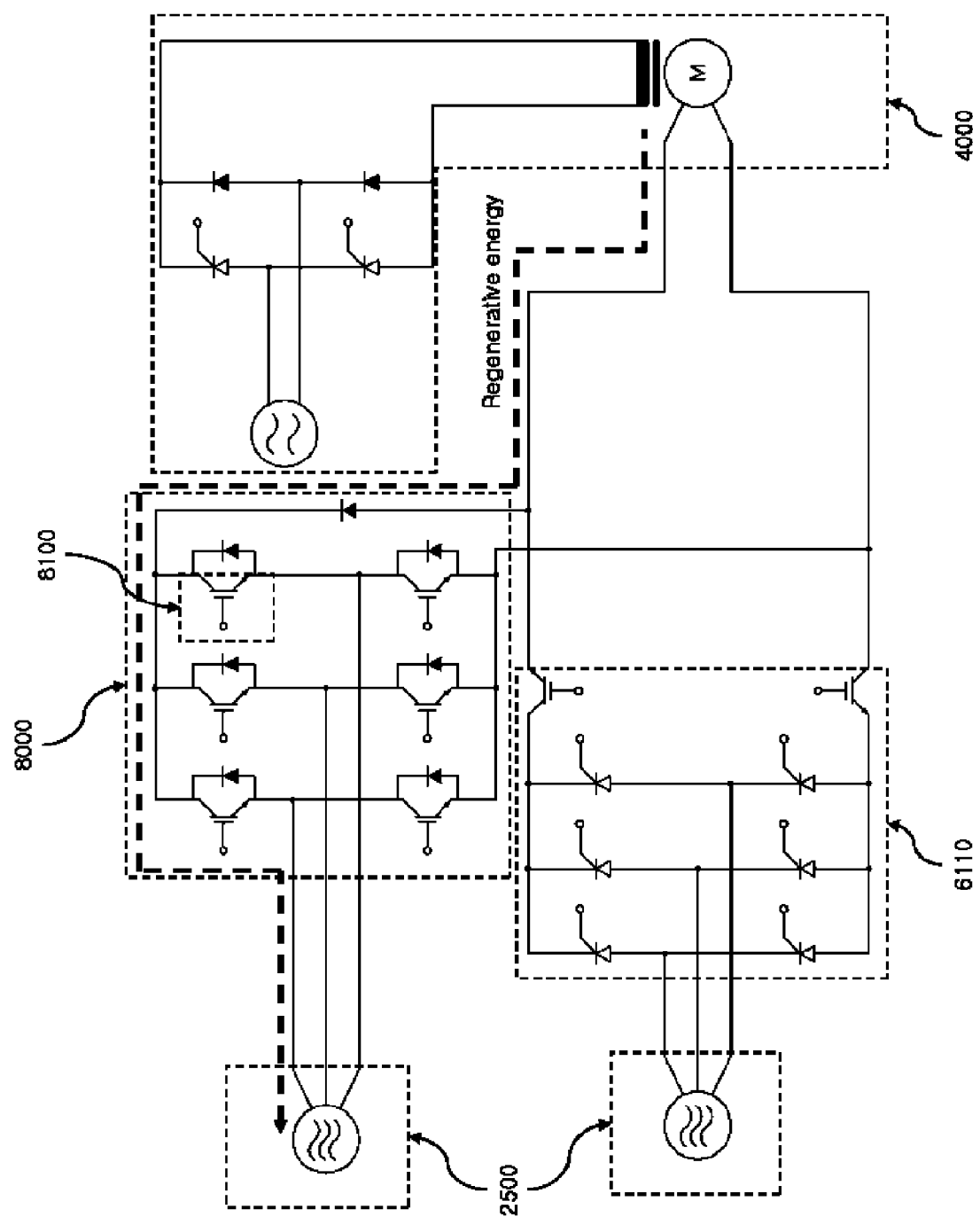
Figure 9:
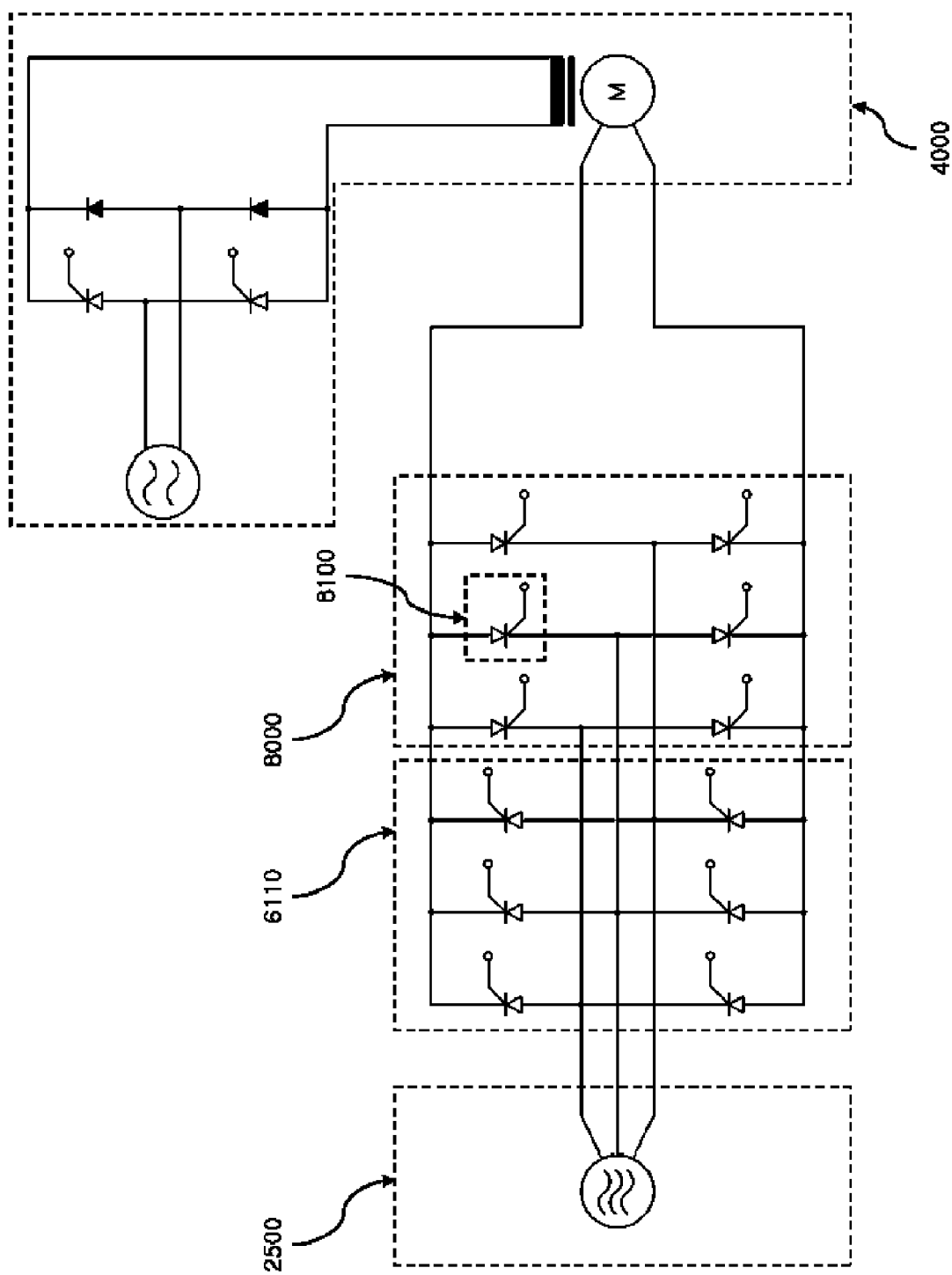

FIGS. 7 to 9 are various circuit diagrams illustrating electrical braking methods using a DC motor according to the exemplary embodiment of the present invention. The power supplying portion 2500 for supplying an AC power, the driving motor 4000 which comprises a DC motor in which a rotation speed is controlled by a voltage difference, the motor driving portion 6000 for controlling a speed of the driving motor 4000, and the electrical braking portion 8000 for providing a braking torque to the driving motor 4000 are shown in FIGS. 7 to 9, respectively.

In case where the power supplying portion 2500 supplies an AC power and the driving motor 4000 is a DC motor, the motor driving portion 6000 may comprise a typical converter.

The converter comprises a converting portion 6110 for rectifying an AC power flowing to the motor driving portion 6000, and the driving motor 4000 comprises an AC field supplying portion connected to an electrical power source. A rotation speed of the motor driving portion 6000 depends on an average voltage magnitude of a pulse-width modulation wave which flows in from the motor driving portion 6000.

The power supplying portion 2500 supplies an AC power which is usually supplied to home.

The converting portion 6110 comprises three pairs of silicon controlled rectifiers (SCRs) for rectifying an AC power supplied from the power supplying portion 2500 and outputs the rectified power through its output terminal. The converting portion 6100 controls a switching element like a transistor arranged at its output terminal to modulate a pulse width in order to control a speed of the driving motor 4000.

When the first control signal for deceleration is transmitted to the motor driving portion 6000 from the control portion 7000 while the driving motor 4000 is rotating at a certain speed, the kinetic energy corresponding to a difference between a current speed and a decelerated speed flows to the motor driving portion 6000 from the driving motor 4000 as regenerative energy, so that the sum of a voltage of the power supplying portion 2500 and a voltage of the regenerative energy is applied between both output terminals of the converting portion 6110.

FIG. 7 shows that the regenerative energy is reduced to the heat energy by using the electrical braking portion 8000, for example, the braking resistor 8200.

The switching portion 8100 of the electrical braking portion 8000 operates when a voltage applied between both output terminals of the converting portion 6110 exceeds a predetermined reference voltage, so that the regenerative energy flowing into the motor driving portion 6000 from the driving motor 4000 is reduced to heat energy by the braking resistor 8200 which comprises a resistor electrically connected between one end of the switching portion 8100 and one end of the converting portion 6110.

Here, the switching portion 8100 may be configured to operate in response to the second control signal transmitted from the control portion 7000.

FIG. 8 shows that the regenerative energy is sent back to the power supplying portion 2500 by the electrical braking portion 8000 for emitting the regenerative energy out of the motor driving portion 6000 or consuming it.

The electrical braking portion 8000 is connected to both ends of the converting portion 6110 which has a similar configuration of the inverting portion 6300 of the inverter shown in FIGS. 4 to 6.

When a voltage applied between both output terminals of the converting portion 6110 exceeds a predetermined reference voltage due to the regenerative energy flowing into the motor driving portion 6000 from the driving motor 4000, the switching portion 8100 of the electrical braking portion 8000 operates to thereby transfer the regenerative energy to the power supplying portion 2500.

Here, a plurality of switching portions 8100 of the electrical braking portion 8000 are respectively controlled to synchronize a phase of the regenerative energy with an AC power of the power supplying portion 2500.

The switching portion 8100 may be configured to operate in response to a circuit configuration of the converter itself or operate by the second control signal transmitted from the control portion 7000.

FIG. 9 shows a reversed-phase braking by using the electrical braking portion 8000 according to the exemplary embodiment of the present invention.

To accelerate the driving motor 4000, the SCRs of the converting portion 6110 are turned on, and the SCRs of the electrical braking portion 8000 are turned off, so that a voltage of a predetermined polarity is supplied to the driving motor 4000.

To decelerate the driving motor 4000, the SCRs of the converting portion 6110 are turned off, and the SCRs of the electrical braking portion 8000 are turned on, so that a voltage of an opposite polarity to that for acceleration is supplied to the driving motor 4000 as a braking torque.

As described above, the treadmill of the present invention processes the regenerative energy generated in the driving motor by using the electrical braking portion, thereby achieving the target braking torque.

Hereinbefore, the electrical braking portion 8000, the motor driving portion 6000, and the driving motor 4000 have been described focusing on their exemplary configuration, but their configuration may be variously modified.

Here, the electrical braking portion 8000 means the regenerative energy processing portion for emitting the regenerative energy generated in the driving motor 4000 out of the motor driving portion 6000 or consuming it in order to brake the driving motor 4000, and may comprise the switching portion 8100 for performing a switching operation for providing the second braking torque.

Figure 10:
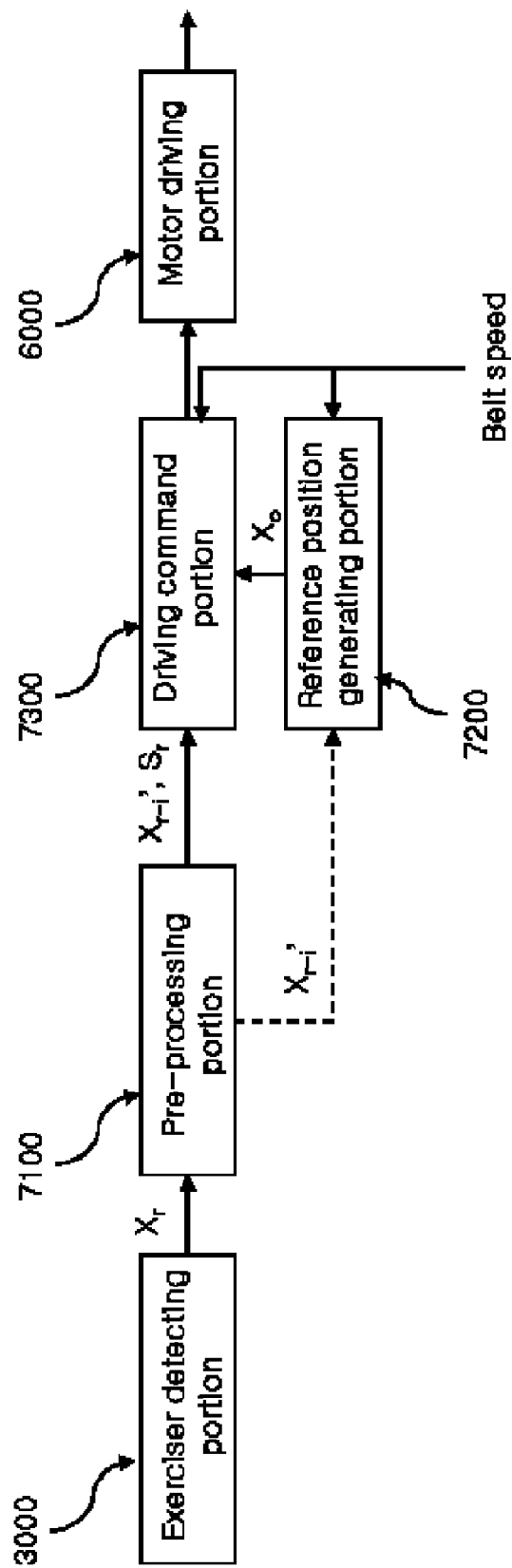
FIGS. 10 to 12 are block diagrams illustrating a control portion according to an exemplary embodiment of the present invention.
Figure 11:
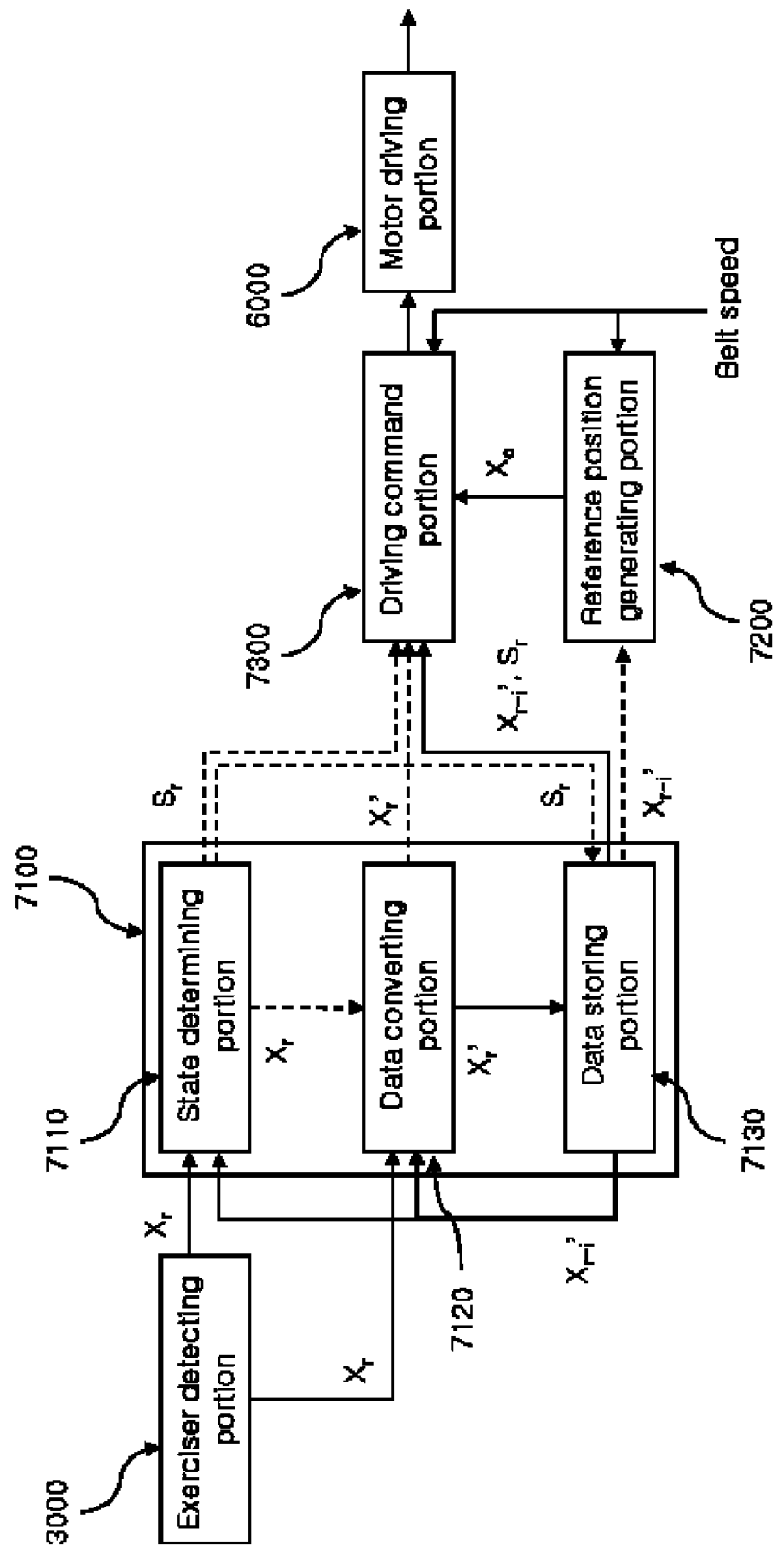
Figure 12:
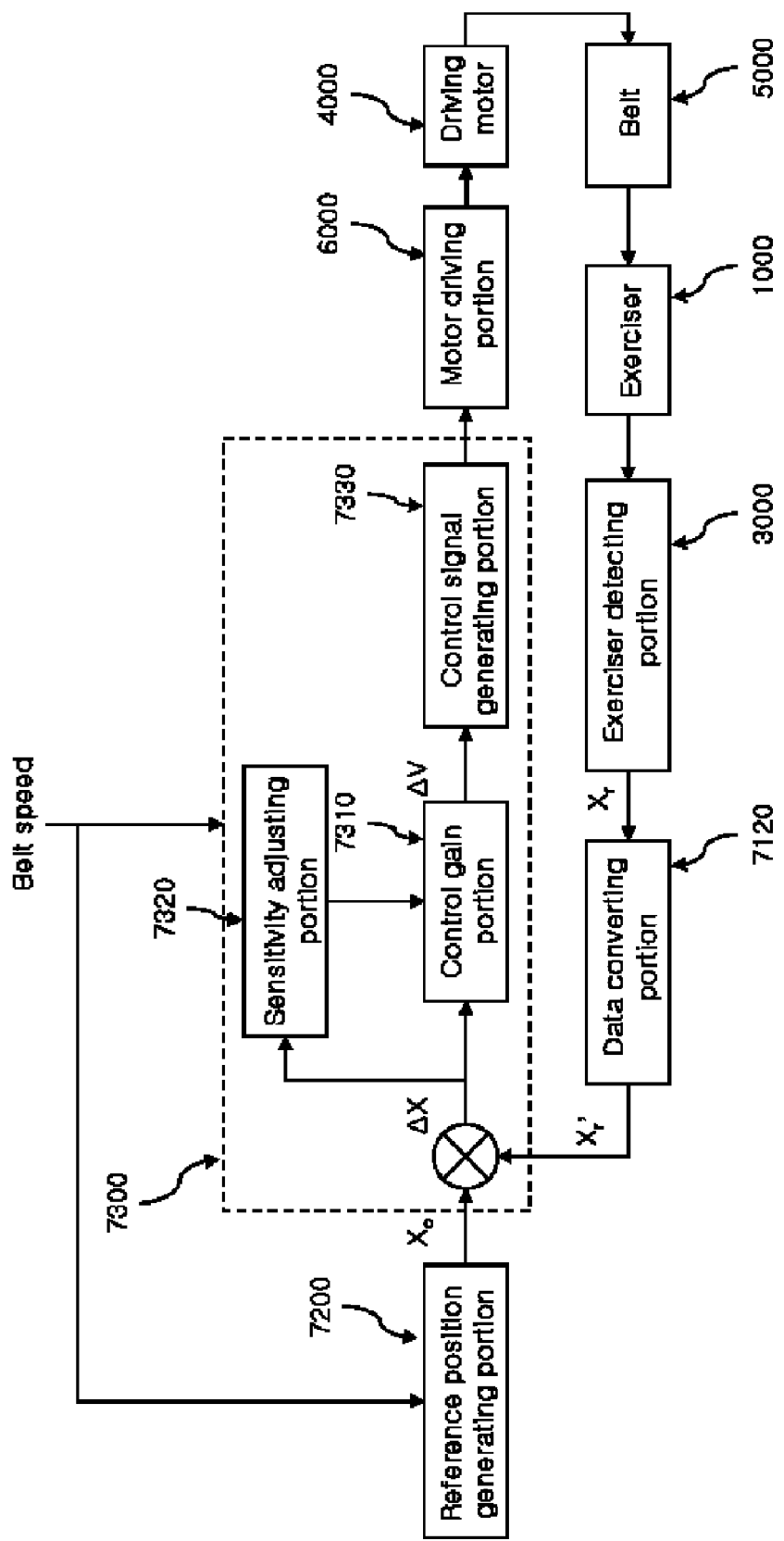

FIGS. 10 to 12 are block diagrams illustrating the control portion according to the exemplary embodiment of the present invention.

In FIG. 10, the control portion 7000 computes a measured value $X_r$ corresponding to a signal obtained by measuring a position of the exerciser 1000 by the exerciser detecting portion 3000 by using a predetermined criterion and transfers the first control signal to the motor driving portion 6000. The control portion 7000 comprises a pre-processing portion 7100, a reference position generating portion 7200, and a driving command portion 7300.

FIGS. 10 to 21 show that the measured value $X_r$ is transferred to the control portion 7000 from the exerciser detecting portion 3000, but this is for easy description and is not limited to it.

The measured value $X_r$ may be a value corresponding to an exerciser position generated in the exerciser detecting portion 3000. Also, the measured value $X_r$ may be a value corresponding to an exerciser position which is converted from a signal transmitted to the control portion 7000 from the exerciser detecting portion 3000.

In the exemplary embodiment of the present invention described below, the measured value $X_r$ means a value generated in the exerciser detecting portion 3000 and then transferred to the control portion 7000.

The pre-processing portion 7100 processes noise and undesired values included in the measured value $X_r$, which corresponds to a signal obtained by measuring a position of the exerciser 1000, transmitted from the exerciser detecting portion 3000 by a data converting criterion to generate a converted value $X_r'$ and transmits the converted value $X_r'$ to the reference position generating portion 7200 and/or the driving command portion 7300.

The pre-processing portion 7100 stores the measured values $X_{r-i}$ (i=0, . . . , n) corresponding to a position of the exerciser 1000 which are measured at a unit time interval or the corresponding converted values $X_{r-i}'$ (i=0, . . . , n) processed by the data converting criterion and transmits the measured values $X_{r-i}$ (i=0, . . . , n) or the converted values $X_{r-i}'$ (i=0, . . . , n) to the reference position generating portion 7200 and the driving command portion 7300.

The pre-processing portion 7100 generates a current state value $S_r$ which represents which state among an accelerating state, a decelerating state and a maintaining state the treadmill is in using a state determining criterion based on the measured values $X_{r-i}$ (i=0, . . . , n) corresponding to a position of the exerciser 1000 which are measured at a unit time interval or the corresponding converted values $X_{r-i}'$ (i=0, . . . , n) processed by the data converting criterion, and transmits the current state value $S_r$ to the driving command portion 7300.

The reference position generating portion 7200 generates a reference position value $X_0$ which is used to determine a difference value with the measured value $X_r$ or the converted value $X_r'$ which corresponds to a current position of the exerciser 1000, and transmits the reference position value $X_0$ to the driving command portion 7300.

Here, the reference position value $X_0$ means a distance from the exerciser detecting portion 3000 that a driving speed of the driving motor 4000 can be constantly maintained when the exerciser 1000 is at a predetermined position.

The reference position generating portion 7200 adjusts the reference position value based on a driving speed containing a belt speed or a corresponding speed thereto. Here, the driving speed may be a rotation speed of the driving motor or a speed corresponding to the rotation speed, for example, a speed of the belt 5000 or the first control signal, transmitted to the motor driving portion 6000 from the control portion 7000.

The driving command portion 7300 computes a difference value $\Delta X$ between the reference position value $X_0$ transmitted from the reference position generating portion 7200 and the measured value $X_r$ corresponding to a position of the exerciser 1000 or the converted value $X_r'$ transmitted from the pre-processing portion 7100 to transmit the first control signal for controlling a speed of the driving motor 4000 to the motor driving portion 6000.

In the exemplary embodiment of the present invention, the converted value $X_r'$ transmitted from the pre-processing portion 7100 is used in order to obtain the difference value $\Delta X$ with the reference position value $X_0$.

The driving command portion 7300 performs a closed-loop control and converts control constants contained in a control equation for a closed-loop control to adjust a control gain, thereby controlling a control sensitivity.

FIG. 11 is a detailed block diagram illustrating the pre-processing portion shown in FIG. 10. The pre-processing portion 7100 comprises a state determining portion 7110, a data converting portion 7120, and a data storing portion 7130.

The state determining portion 7110 determines which state among the accelerating state, the decelerating state and the maintaining state the exerciser 1000 is in using the state determining criterion and generates the current state value $S_r$ corresponding to a current state of the exerciser 1000.

The data converting portion 7120 processes noise and undesired values included in the measured values $X_r$ which correspond to a signal transmitted from the exerciser detecting portion 3000 using the data converting criterion to generate the converted value $X_r'$.

The data storing portion 7130 stores the measured values $X_{r-i}$ (i=0, ..., n) which are measured at a unit time interval or the converted values $X_{r-i}'$ (i=0, ..., n) which are generated at a unit-time interval by the data converting portion 7120. The data storing portion 7130 may store the state values $S_{r-i}$ (i=0, ..., n) which are generated at a unit time interval in the state determining portion 7110.

In more detail, the state determining portion 7110 compares the current measured value $X_r$ containing noise and undesired data transmitted from the exerciser detecting portion 3000 to the past values $X_{r-i}^T$ (i=1, ..., n) stored in the data storing portion 7130 to determine the current state using the state determining criterion, thereby generating the current state value $S_r$ which is one of the accelerating state, the decelerating state or the mainlining state.

In an exemplary embodiment of the present invention, the past converted values $X_{r-i}'$ (i=1, ..., n) are used as the past values $X_{r-i}^T$ (i=1, ..., n) to be compared to the current measured value $X_r$ to generate the current state value $S_r$.

The generated current state value $S_r$ may be stored in the data storing portion 7130 or may be transmitted to the driving command portion 7300 to be used to generate the first control signal.

In more detail, the data converting portion 7120 determines a forward or backward direction of the exerciser 1000 based on the past values $X_{r-i}^T$ (i=1, ..., n) and the current measured value $X_r$ to generate the current converted value $X_r'$.

In the exemplary embodiment of the present invention, the past converted values $X_{r-i}'$ (i=1, ..., n) are used as the past values $X_{r-i}^T$ (i=1, ..., n) to be compared to the current measured value $X_r$ to generate the current converted value $X_r'$.

The current converted value $X_r'$ generated is stored in the data storing portion 7130 for a comparison for generating the converted value $X_{r+i}'$ of the measured value $X_{r+1}$ of the next unit time and is transmitted to the driving command portion 7300 to be used to compute the position difference value $\Delta X$ which is a difference with the reference position value $X_0$. Also, the current converted value $X_r'$ may be transmitted to the reference position generating portion 7200 to be used to generate the reference position value $X_0$.

FIG. 12 is a detailed block diagram illustrating the driving command portion 7300 shown in FIG. 10. The driving command portion 7300 comprises a control gain portion 7310, a sensitivity adjusting portion 7320, a control signal generating portion 7330.

The control gain portion 7310 generates a control gain $\Delta V$ corresponding to a speed by applying the position difference value $\Delta X$ which is a difference between the reference position value $X_0$ transmitted from the reference position generating portion 7200 and the current value $X_r^T$, for example, the current converted value $X_r'$ transmitted from the pre-processing portion 7100 to a PI control of Equation 1 or a PID control of Equation 2

$$\Delta V_j = K_p \Delta X_j + K_i \int_0^j \Delta X_t dt \qquad \text{[Equation 1]}$$

$$\Delta V_j = K_p \Delta X_j + K_i \int_0^j \Delta X_t dt + K_d \frac{d\Delta X_j}{dt} \qquad \text{[Equation 2]}$$

Here, a proportional constant $K_p$, an integral constant $K_1$, and a differential constant $K_d$ which are used as control constants are adjusted by the sensitivity adjusting portion 7320 in order to accept various exercising patterns of the exerciser 1000.

In the exemplary embodiment of the present invention, an experiment has been performed by using a PI control, which is fast in response speed and small in target value error, expressed by Equation 1, but other control methods can be used.

The control signal generating portion 7330 generates the first control signal for controlling a speed of the driving motor 4000 through the motor driving portion 6000 based on the control gain $\Delta V$ transmitted from the control gain portion 7310 and transmits the first control signal to the motor driving portion 6000.

The sensitivity adjusting portion 7320 changes the values of the control constants used in the control gain portion 7310 in consideration of various exercising patterns of the exerciser 1000 to adjust the sensitivity of a speed response of the belt to movement of the exerciser 1000.

The respective components 7100, 7200 and 7300 contained in the control portion 7000 may be respectively configured in separate physical spaces or may be configured by a program code in a single physical space.

Figure 13:
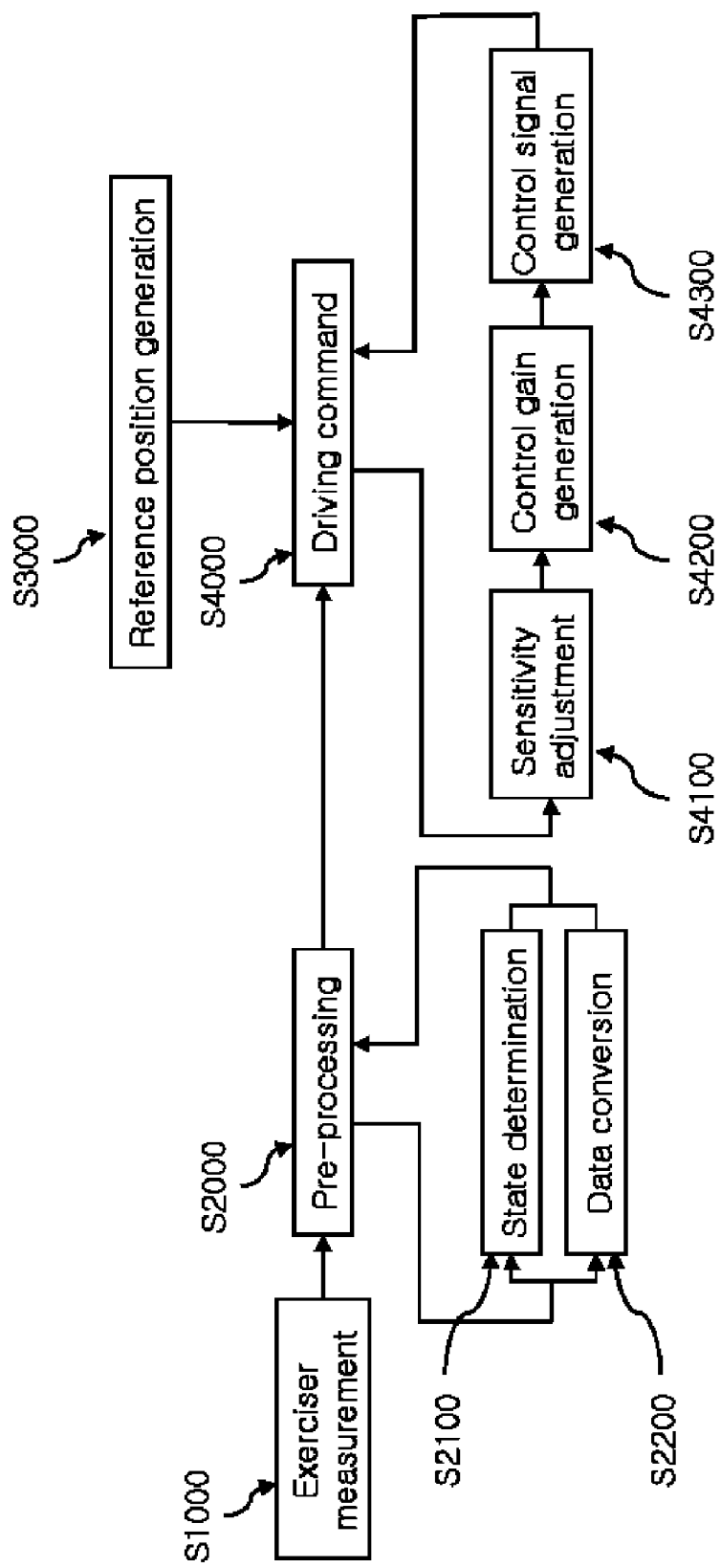
FIG. 13 is a flowchart illustrating a control method of the control portion according to an exemplary embodiment of the present invention.

FIG. 13 is a flowchart illustrating a control method of the control portion 7000 according to the exemplary embodiment of the present invention. The control method of the control portion 7000 comprises a position measuring step S1000 for the exerciser detecting portion 3000 measuring a position of the exerciser, a pre-processing step S2000 for the control portion 7000 receiving a measured signal or a corresponding measured value $X_r$ and converting the measured value $X_r$ to the converted value $X_r'$ by the pre-processing procedure, a reference position generating step S3000 for generating the reference position value $X_0$ based on the driving speed, which can include the belt speed or a speed corresponding to the belt speed, and a driving command step S4000 for transmitting the first control signal to the motor driving portion 6000 based on either of the measured value $X_r$ and the converted value $X_r'$ and the reference position value $X_0$ to perform a driving command.

The pre-processing step S2000 comprises a state determining step S2100 for determining a current state of the exerciser and a data converting step S2200 for converting the measured value $X_r$ to the converted value $X_r'$.

The driving command step S4000 comprises a sensitivity adjusting step S4100 for determining the driving speed containing the belt speed or the speed corresponding to the belt speed or a position change rate of the exerciser to adjust the control constant, a control gain generating step S4200 for generating the control gain by the closed-loop control equation, and a control signal generating step S4300 for transmitting a command to the motor driving portion 6000 based on the control gain.

Figure 14:
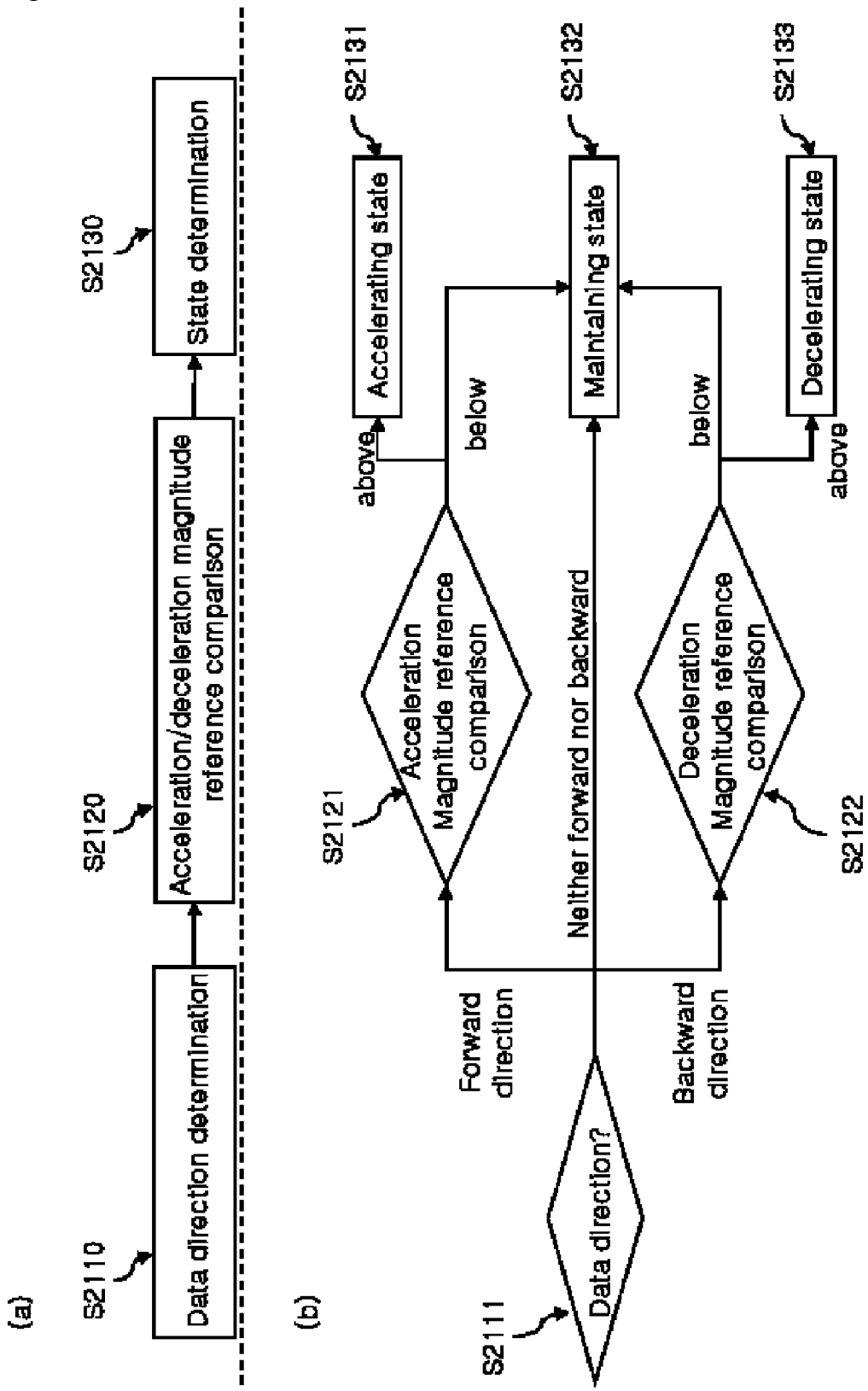
FIG. 14 is a flowchart illustrating an operation of a state determining portion according to an exemplary embodiment of the present invention.

FIG. 14 is a flowchart illustrating an operation of the state determining portion according to the exemplary embodiment of the present invention. In the flowchart of FIG. 14, the portion marked as "(a)" shows steps according to performed functions, and the portion marked "(b)" shows a determining criterion of each step in the portion "(a)".

The state determining step S2100 includes a data direction determining step S2110 for determining a forward or backward direction in which the measured value $X_r$ or the converted value $X_r'$ obtained at a unit-time interval changes with respect to an immediately previous or previous measured value or an immediately previous or previous converted value, that is, for determining a data direction corresponding to a forward or backward direction in which a subsequent data value among data values $X_{r-i}^o$ (i=0, ..., n) changes in with respect to a preceding data value; an acceleration/deceleration magnitude reference comparing step S2120 for determining whether a difference between a measured value or converted value of a predetermined previous unit time which is used as a reference value, for example, a preceding data value of a predetermined previous unit time which is used as a reference value and a current measured value or current converted value satisfies a predetermined criterion $C_a$ or $C_d$ or not; and a state determining step S2130 for finally determining the current state.

The state determining step S2130 may further include a step for generating a state value $S_r$ by using a value corresponding to the current exerciser state.

The data direction determining step S2110 uses the past values $X_{r-i}^T$ (i=1, ..., n) stored in the data storing portion 7130 and the current value $X_r^T$. Here, an immediately previously occurring converted value and earlier previous converted values are used as the past values $X_{r-i}^T$ (i=1, ..., n), and the current measured value Xr is used as the current value $X_r^T$. If the past values $X_{r-i}^T$ (i=1, ..., n) and the current value $X_r^T$ comprises only of a continuous forward direction or a maintaining direction and the difference between the past value $X_{r-j}^T$ (j is a positive integer) of the predetermined previous unit time and the current value $X_r^T$ results in a forward direction, then the procedure goes to an acceleration magnitude reference comparing step S2121. That is, if the subsequent data value among the data values $X_{r-i}^o$ (i=0, ..., n) is configured to be a continuous forward direction or a maintaining direction with respect to the preceding data value only, and the current value $X_r^T$, has a data direction (which is either a continuous forward direction or a maintaining direction with respect to the preceding data value) which is a forward direction, then the procedure goes to the acceleration magnitude reference comparing step S2121.

Also, if the past values $X_{r-i}^T$ (i=1, ..., n) and the current value $X_r^T$ are configured as a continuous backward direction or maintaining direction and a difference between the past value $X_{r-j}^T$ (j is a positive integer) of the predetermined previous unit time and the current value $X_r^T$ results in a backward direction, then the procedure goes to a deceleration magnitude reference comparing step S2122. That is, if the subsequent data value among the data values $X_{r-i}^o$ (i=0, ..., n) comprises only of a continuous backward direction or a maintaining direction with respect to the preceding data value, and the current value $X_r^T$ has a data direction (which is generated as either a backward direction or a maintaining direction with respect to the preceding data value) is a backward direction, then the procedure goes to the deceleration magnitude reference comparing step S2122.

Further, if the data values $X_{r-i}^o$ (i=0, ..., n) do not have a continuous direction, that is, a forward direction and a backward direction exist together in the data values $X_{r-i}^o$ (i=0, ..., n) or the data values $X_{r-i}^o$ (i=0, ..., n) have a continuous maintaining direction, then the procedure does not go to the acceleration/deceleration magnitude reference comparing step S2120, and in the state determining step S2130, the current sate is determined as a maintaining state (step S2132).

Preferably, the data direction is determined by using the past values $X_{r-i}'$ (i=1, 2, 3) of at least 3 previously occurring unit times immediately before the current unit time, for example, the values $X_{r-i}'$ (i=1, ..., n) where n is equal to or more than 3, as the past values $X_{r-i}^T$ (i=1, ..., n) and the current measured value $X_r$ as the current value $X_r^T$.

In the acceleration magnitude reference comparing step S2121 of the acceleration/deceleration magnitude reference comparing step S2120, when a data direction is determined as a forward direction in the data direction determining step S2111, it is determined whether a difference value between a past value $X_{r-j}^T$ (j is a positive integer) of a predetermined previous unit time and a current value $X_r^T$ exceeds the predetermined acceleration magnitude reference value $C_a$ or not (step S2121). If the difference value exceeds the predetermined acceleration magnitude reference value $C_a$, then the current state is determined as an acceleration state (step S2131). If the difference value is equal to or less than a predetermined acceleration magnitude reference value $C_a$, then the current state is determined as a maintaining state (step S2132).

When a data direction is determined as a backward direction in the data direction determining step S2111, in the deceleration magnitude reference comparing step S2122, it is determined whether a difference value between a past value $X_{r-j}^T$ (j is a positive integer) of a predetermined previous unit time and a current value $X_r^T$ exceeds a predetermined deceleration magnitude reference value $C_d$ or not (step S2122). If the difference value exceeds the predetermined deceleration magnitude reference value $C_d$, then the current state is determined as a deceleration state (step S2133), and if the difference value is equal to or less than the predetermined deceleration magnitude reference value $C_d$, then the current state is determined as a maintaining state (step S2132).

The data direction is determined by using preferably the past value $X_{r-2}^T$ of an at least second most recent or earlier previous unit time from the current unit time, more preferably the past value $X_{r-3}^T$ of a third most recent previous unit time as the past value $X_{r-j}^T$ (j is a positive integer) of a predetermined previous unit time to be compared in difference with the current measured value $X_r$, and the current measured value $X_r$ as the current value $X_r^T$.

Also, the state determining step S2130 may further include a step for generating an accelerating state, a maintaining state or a decelerating state as the current state $S_r$. The generated current state $S_r$ may be stored in the data storing portion 7130 or may be used in the driving command portion 7300.

Figure 15:
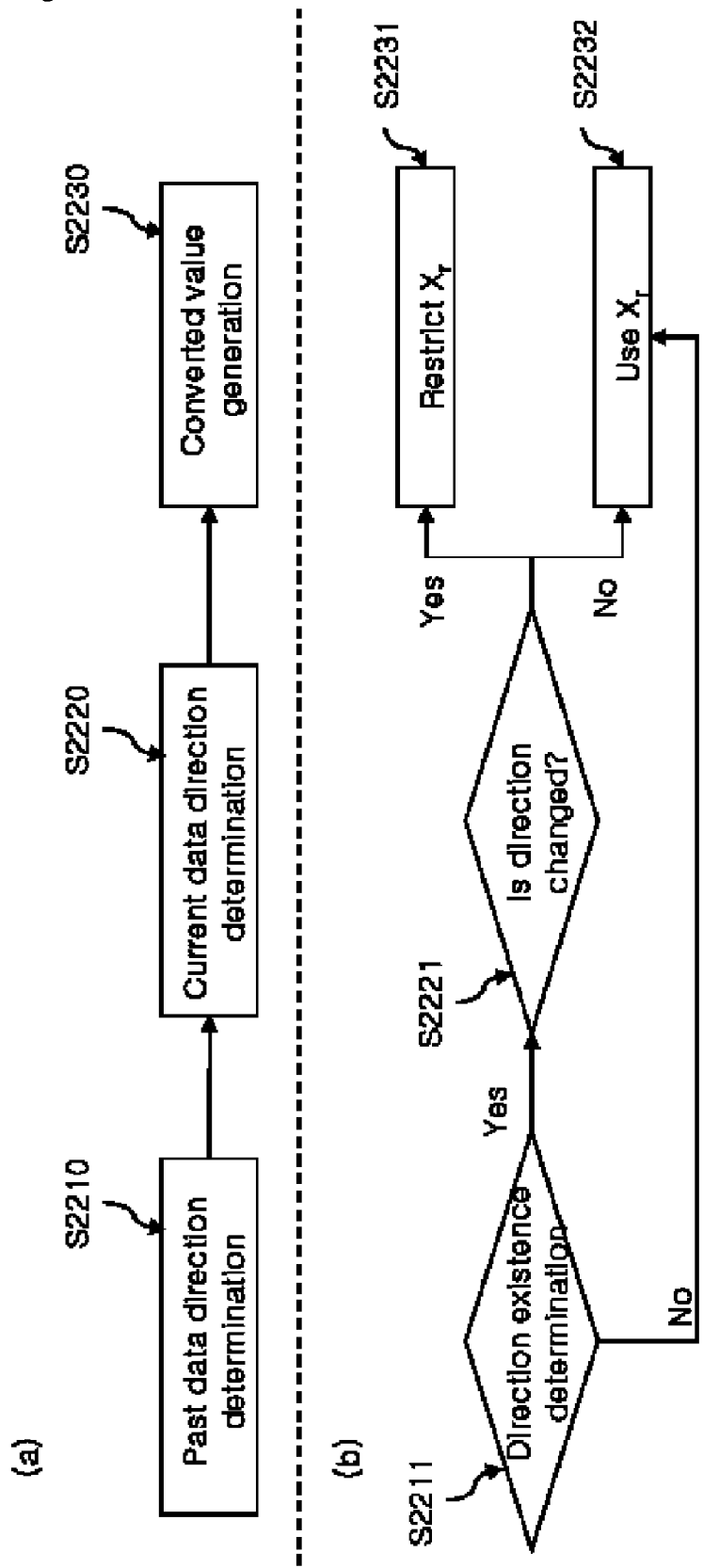

FIG. 15 is a flowchart illustrating an operation of the data converting portion according to the exemplary embodiment of the present invention. In the flowchart of FIG. 15, the portion marked "(a)" shows steps according to performed functions, and the portion marked "(b)" shows a determining criterion of each step in the portion "(a)".

The data converting step S2200 includes a past data direction determining step S2210 for determining a direction in which the past values $X_{r-i}^T$ (i=1, ..., n) change, a current data direction determining step S2220 for determining a direction of the current measured value $X_r$ relative to the immediately previous past value $X_{r-1}^T$, and a converted value generating step S2230 for converting/generating the current measured value $X_r$ into the current converted value $X_r'$.

The converted value generating step S2240 may further include a step for converting a weighted average value of a converted value $X_r'$ once converted by the above step and the past values $X_{r-i}^T$ (i=1, ..., n) predetermined unit times (n) into the current converted value $X_r'$.

The past data direction determining step S2210 determines whether the past values $X_{r-i}^T$ (i=1, ..., n) continuously results in a forward direction or a maintaining direction or continuously results in a backward direction or a maintaining direction using the past values $X_{r-i}^T$ (i=1, ..., n) of from a predetermined previous unit time (n), and determines whether there exists a constant direction that a difference with the past value $X_{r-n}^T$ of the predetermined previous unit time is generated in a forward direction or a backward direction or not (step S2211).

If it is determined in the past data direction determining step S2210 that there is no constant direction, e.g., since the past values $X_{r-i}^T$ (i=1, ..., n) have only a maintaining direction (i.e., same values), or have a forward direction and a backward direction together, then the current converted value $X_r'$ is generated in the converted value generating step S2230 using the current measured value $X_r$ without going to the current data direction determining step S2220 (step S2232). In this instance, the current measured $X_r$ is used as the current converted value $X_r'$.

If it is determined in the past data direction determining step S2210 that a constant direction exists, e.g., since the past values $X_{r-i}^T$ (i=1, ..., n) continuously results in a forward direction or a maintaining direction or continuously results in a backward direction or a maintaining direction and a difference with the past value $X_{r-n}^T$ of a predetermined previous unit time (n) also results in a forward direction or a backward direction, then the procedure goes to the current data direction determining step S2220.

In the exemplary embodiment of the present invention, the past values $X_{r-i}'$ (i=1, 2, 3) of 3 previously occurring unit times immediately before the current unit time are used as the past values $X_{r-i}^T$ (i=1, ..., n) used in the past data direction determining step S2210.

The current data determining step S2220 determines whether the current value (current measured value) maintains a direction of the past data (past converted value) determined by the past data direction determining step S2210 or not. In cases where the past values $X_{r-i}^T$ (i=1, ..., n) have a forward direction which has a continuous forward direction or maintaining direction, if the current value (current measured value) changes in a backward direction compared to the immediately previous past value $X_{r-1}^T$, then the current converted value $X_r'$ is generated by restricting the current measured value $X_r$ (step S2231) in the converted value generating step S2230.

Similarly, in case where the past values $X_{r-i}^T$ (i=1, ..., n) have a backward direction which has a continuous backward direction or maintaining direction, if the current value (current measured value) changes in a forward direction compared to the immediately previous past value $X_{r-1}^T$, then the current converted value $X_r'$ is generated by restricting the current measured value $X_r$ (step S2231) in the converted value generating step S2230.

That is, it is determined whether a direction of the current value (current measured value) changes with respect to the past values $X_{r-i}^T$ (i=1, ..., n) or not (step S2221). If it changes, in the converted value generating step S2230, the current measured value $X_r$ is restricted to generate the current converted value $X_r'$ (step S2231), whereas if it does not change, the current converted value $X_r'$ is generated by using the current measured value $X_r$ (step S2232).

This is done because it is physically impossible for the exerciser to change to a deceleration state immediately from an acceleration state or to an acceleration state immediately from a deceleration state. Thus, the current measured value $X_r$ is converted into the current converted value $X_r'$ which is a physically possible value for the current value $X_r^T$.

In addition to the determining steps and the determining criterions of FIG. 15, if based on the past values $X_{r-i}^T$ (i=1, ..., n) of from a predetermined previous unit time (n) and the current value (current measured value), it is determined that the past values $X_{r-i}^T$ (i=1, ..., n) from a predetermined previous unit time (n) and the current value (current measured value) continuously have only a forward direction or a maintaining direction or continuously have only a backward direction or a maintaining direction and a difference with the pas value $X_{r-n}^T$ of the predetermined previous unit time (n) generates a forward direction or a backward direction, then the current measured value $X_r$ may be used to generate the current converted value $X_r'$ (step S2232). Otherwise, that is, if a forward direction and a backward direction exist together, then the current measured value $X_r$ may be restricted to generate the current converted value $X_r'$ (step S2231).

In the step S2231 of the converted value generating step S2230 for restricting the current measured value $X_r$ to generate the current converted value $X_r'$, the past value $X_{r-1}^T$ of a first, most recent previous unit time which is the immediately previous unit time is preferably used as the current converted value $X_r'$.

After generating the current converted value $X_r'$ as described above, the current converted value $X_r'$ may be used in a subsequent control procedure "as is" but in order to prevent the current converted value $X_r'$ from greatly changing from the immediately previous converted value $X_{r-1}'$, the procedure may further include a weight-averaging step for generating a final converted value $X_r'$ by weight-averaging the past values $X_{r-i}'$ (i=1, . . . , k) of predetermined unit times (k) and the current converted value $X_r'$.

The past converted values $X_{r-1}'$ (i=1, 2, 3) of 3 (first to third) previous unit times are to preferably used as the past converted values $X_{r-i}'$ for a weight average.

FIG. 16 is a flowchart illustrating an operation of the data converting portion according to another exemplary embodiment of the present invention.

Hereinafter, a term "a normal range reference $N_r$" includes an acceleration normal range reference $N_a$ and a deceleration normal range reference $N_d$. The normal range reference $N_r$ means a reference for determining whether the current measured value is normal or not based on a difference with the past value $X_{r-k}^T$ (k is a positive integer) of a predetermined previous unit time (k).

The data converting step S2200 of FIG. 16 includes a normal range control step S2240, a normal range determining step S2250, and a converted value generating step S2260.

In the normal range determining step S2250, a result of a function using the current measured value $X_r$ and/or the past value $X_{r-k}^T$ (k is a positive integer) of a predetermined previous unit time (k) is compared to the normal range reference $N_r$.

In the normal range determining step S2250, it is determined whether a difference between the current measured value $X_r$ and the past value $X_{r-k}^T$ (k is a positive integer) of a predetermined previous unit time (k) is in the normal range reference $N_r$ or not (step S2251). If the difference is in the normal range reference $N_1$, the current converted value $X_r'$ is generated by using the current measured value $X_r$ "as is" (step S2261), whereas if the difference is not in the normal range reference $N_r$, the current converted value $X_r'$ is generated by restricting the current measured value $X_r$ (step S2262).

If the difference between the current measured value $X_r$ and the past value $X_{r-k}^T$ (k is a positive integer) of a predetermined previous unit time (k) is not in the normal range reference $N_r$, a count (i, i is an integer) with a predetermined initial value is increased by 1 (i=i+1) (step S2253), whereas if the difference is in the normal range reference $N_r$, the count (i) is reset to the initial value (step S2252). The initial value of the count (i) is preferably set to zero (0).

In the normal range control step S2240, the normal range reference is adjusted, maintained or initialized by comparing the count (i) (step S2241).

In more detail, if the count (i) is larger than the initial value and is equal to or less than a predetermined reference (n, n is an integer), the normal range reference $N_r$ is adjusted (step S2242). Preferably, an absolute value of the normal range reference $N_r$ is adjusted. In the below description, the normal range reference $N_r$ will be described focusing on the deceleration normal range reference $N_d$, and the acceleration normal range reference $N_a$ will be easily understood from the description by reversing a sign by a person skilled in the art.

The normal range reference $N_r$ may be adjusted by using the same change magnitude or difference change magnitudes.

If the count (i) has the initial value, the normal range reference $N_r$ is initialized (step S2243), and if the count (i) is larger than the predetermined reference (n), the normal range reference $N_r$ is maintained (step S2244).

The normal range reference $N_r$ corresponding to the predetermined reference (n), i.e., a maximum value of the normal range reference $N_r$ is preferably set to correspond to a magnitude of a position change generated by an exerciser with an excellent exercising ability, and the normal range reference $N_r$ of when the count (i) has the initial value, i.e., an initial value of the normal range reference $N_r$ is preferably set to be equal to or less than the maximum value of normal range reference $N_r$.

The acceleration normal range reference $N_a$ and the deceleration normal range reference $N_d$ may have the same value or difference values from each other. For example, in the normal range determining step S2250, if a change of the current measured value $X_r$ to the past value $X_{r-k}^T$ (k is a positive integer) of a predetermined previous unit time (k) has a forward direction, the acceleration normal range reference $N_a$ may be applied as the normal range reference $N_r$, whereas if a change of the current measured value $X_r$ to the past value $X_{r-k}^T$ (k is a positive integer) of a predetermined previous unit time (k) has a backward direction, the deceleration normal range reference $N_d$ may be applied as the normal range reference $N_r$. In the exemplary embodiment of the present invention, the acceleration normal range reference $N_a$ and the deceleration normal range reference $N_d$ have different values from each other.

The predetermined reference (n) to be compared with the count (i) when a change of the current measured value $X_r$ to the past value $X_{r-k}^T$ (k is a positive integer) of a predetermined previous unit time (k) has a forward direction may have the same value as or may have a different value from when a change of the current measured value $X_r$ to the past value $X_{r-k}^T$ (k is a positive integer) of a predetermined previous unit time (k) has a backward direction. In the exemplary embodiment of the present invention, the predetermined reference (n) to be compared with the count (i) when a change of the current measured value $X_r$ to the past value $X_{r-k}^T$ (k is a positive integer) of a predetermined previous unit time (k) has a forward direction has a different value from when a change of the current measured value $X_r$ to the past value $X_{r-k}^T$ (k is a positive integer) of a predetermined previous unit time (k) has a backward direction.

In the exemplary embodiment of the present invention, in the step S2262 of the converted value generating step S2260 for restricting the current measured value $X_r$ to generate the current converted value $X_r'$, a value obtained by adding the normal range reference $N_r$ to the past value $X_{r-k}^T$ (k is a positive integer) of a predetermined previous unit time (k) is generated as the current converted value $X_r'$.

That is, when the current measured value $X_r$ exceeds the normal range reference $N_r$ with respect to the past value $X_{r-k}^T$ (k is a positive integer) of a predetermined previous unit time (k), the current converted $X_r'$ is generated by restricting the current measured value $X_r$ such that the normal range reference $N_r$ is set as a change limit of the current converted value $X_r'$ with respect to the past value $X_{r-k}^T$ (k is a positive integer) of a predetermined previous unit time (k).

Of course, a value which is equal to or smaller than a value obtained by adding the normal range reference $N_r$ to the past value $X_{r-k}^T$ (k is a positive integer) of a predetermined previous unit time (k) may be generated as the current converted value $X_r'$.

In the exemplary embodiment of the present invention, the immediately previous past value $X_{r-1}^T$, for example, the past value of the first most recent previous unit time (k=1) is used as the past value $X_{r-k}^T$ (k is a positive integer) of a predetermined previous unit time (k) used to determine whether the current measured value $X_r$ exceeds the normal range reference $N_r$ or not.

After generating the current converted value X; as described above, the current converted value may be used in a subsequent control procedure "as is" but in order to prevent the current converted value $X_r'$ from greatly changing from the immediately previous converted value $X_{r-1}'$, the procedure may further include a weight-averaging step for generating a final converted value $X_r'$ by weight-averaging the past values $X_{r-i}'$ (i=1, . . . , k) of predetermined unit times and the current converted value $X_r'$ obtained by the above procedure.

The past converted values $X_{r-1}'$ (i=1, 2, 3) of 3 (first to third) previous unit times are preferably used as the past converted values $X_{r-i}'$ for a weight average.

Each step and a combination relationship between the respective steps of FIG. 16 may be variously modified by a person skilled in the art.

Also, a person skilled in the art can sufficiently understand that the normal range reference of FIG. 16 can be applied to the flowchart of FIG. 15.

For example, in the converted value generating step S2230, the step S2232 for using the current measured value $X_r$ to generate the current converted value $X_r'$ shown in FIG. 15 may be replaced with the step for determining the normal range reference $N_r$ shown in FIG. 16.

FIG. 17 is a flowchart illustrating an operation of the reference position generating portion according to the exemplary embodiment of the present invention, which includes a belt speed determining step S3010 for determining a speed of the driving belt and a reference position value adjusting step S3020 for adjusting and generating a reference position corresponding to the speed.

The belt speed determining step S3010 is a step for determining a driving speed containing a belt speed or a speed corresponding to the belt speed which is to be transferred to the reference position generating portion 7200. The driving speed may be computed using the first control signal transmitted to the motor driving portion 6000 from the control portion 7000 or using a signal transmitted to the driving motor 4000 from the motor driving portion 6000.

The driving speed may be computed by measuring a rotation speed of the driving motor 4000 or the roller 2310 or by directly measuring a moving speed of the driving belt 5000.

In the reference position value adjusting step S3020, the reference position value $X_0$ is decreased if the driving speed is fast, whereas the reference position value $X_0$ is increased if the driving speed is slow.

While the exerciser 1000 exercises at a low speed, the reference position value $X_0$ is set to be far from the exerciser detecting portion 3000 in order to achieve a fast acceleration, whereas while the exerciser 1000 exercises at a high speed, the reference position value $X_0$ is set to be short from the exerciser detecting portion 3000 in order to achieve a fast deceleration.

That is, the reference position value $X_0$ is variably controlled depending on a speed of the driving belt such that the reference position value $X_0$ is increased if the driving speed is slow and the reference position value $X_0$ is decreased if the driving speed is fast.

Also, based upon a moving direction of a top surface of the belt which supports the exerciser, the reference position value $X_0$ is set to be short from a start point of the belt if the driving speed is fast, and the reference position value $X_0$ is set to be far from the start point of the belt if the driving speed is slow.

A range in which the reference position value $X_0$ is varied preferably corresponds to a distance of from the start point to the end point in a moving direction of the top surface of the belt. That is, a range in which the reference position value $X_0$ is varied is preferably less than the length of the top surface of the belt.

More preferably, a range in which the reference position value $X_0$ is varied is separated by a predetermined distance from the start point and the end point of the top surface of the belt. This is because when the reference position value $X_0$ which is a reference for causing acceleration or deceleration by using a difference with the current position of the exerciser is too close to the start point or the end point of the top surface of the belt, then the risk to the exerciser may increase.

Figure 18:
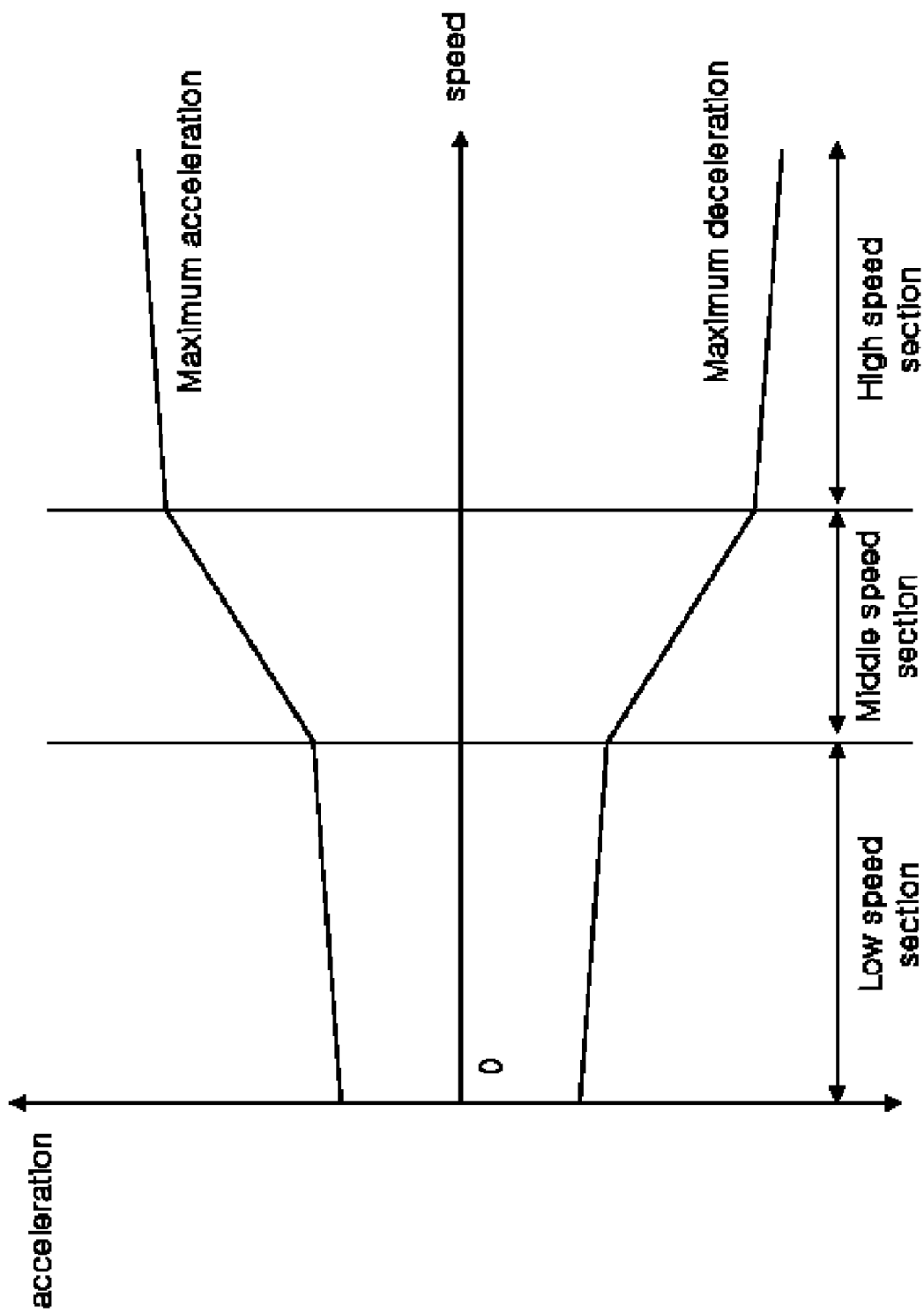
FIG. 18 is a graph illustrating a method for restricting a maximum acceleration/deceleration according to an exemplary embodiment of the present invention.

FIG. 18 is a graph illustrating a method for restricting a maximum acceleration/deceleration according to the exemplary embodiment of the present invention.

A maximum acceleration/deceleration is restricted depending on a speed to the extent that can prevent the treadmill from applying an acceleration/deceleration that is difficult for the exerciser 1000 to react to, thereby reducing injury risk for the exerciser 1000.

Also, an abrupt acceleration/deceleration in a low speed section may cause the exerciser to feel uncomfortable and may be risky. But, a treadmill needs to rapidly follow the exerciser's acceleration/deceleration intent in a high speed section. For the foregoing reasons, a maximum acceleration/deceleration is restricted depending on a speed.

As shown in FIG. 1, in case of a low speed, since the areas A-a and B-a, in which a deceleration is larger than the upper target deceleration 220, may pose risk to the exerciser as can bee seen by the target deceleration line segments 210 and 220, the maximum deceleration is thus preferably set to a value equal to or less than the upper target deceleration 220. In case of a high speed, since the upper target deceleration 220 is large, the maximum deceleration of a high speed is thus preferably set to a larger value than that of a low speed.

Even though it depends on the exerciser's exercising ability, the exerciser can exercise with a good exercising feeling with a deceleration of up to the target deceleration corresponding to the driving speed containing the belt speed or a speed corresponding to the belt speed, but the exerciser may feel uncomfortable or fall down in an abrupt deceleration of more than the target deceleration.

The experiment according to the exemplary embodiment of the present invention shows that the upper target deceleration 220 is about 2.5 km/h per second when the driving speed is a low speed of 5 km/h, and the upper target deceleration 220 is about 9.5 km/h per second when the driving speed is a high speed of 19 km/h.

Therefore, it is preferred that the maximum deceleration is restricted to a large value if the driving speed is fast and to a small value if the driving speed is slow.

A similar principle can be applied to a restriction of the maximum acceleration depending on the driving speed.

The driving speed can be computed or measured by the various methods described in FIG. 17, and the maximum acceleration and the maximum deceleration are adjusted depending on the speed.

In a low speed section in which the driving speed is slow, the maximum acceleration and/or the maximum deceleration are set to a small value, and in a high speed section in which the driving speed is fast, the maximum acceleration and/or the maximum deceleration are set to a large value.

Also, in a middle speed section which the driving speed is not fast nor slow, the maximum acceleration and/or the maximum deceleration are increased as the driving speed is increased.

Such a restriction of the maximum acceleration/deceleration depending on the driving speed is performed by the driving command portion 7300 of the control portion 7000, preferably by the control signal generating portion 7330.

The control signal generating portion 7330 restricts the first control signal to be output, based on the driving speed and a control gain ΔV which is a signal corresponding to an acceleration/deceleration generated in the control gain portion 7310.

Figure 19:
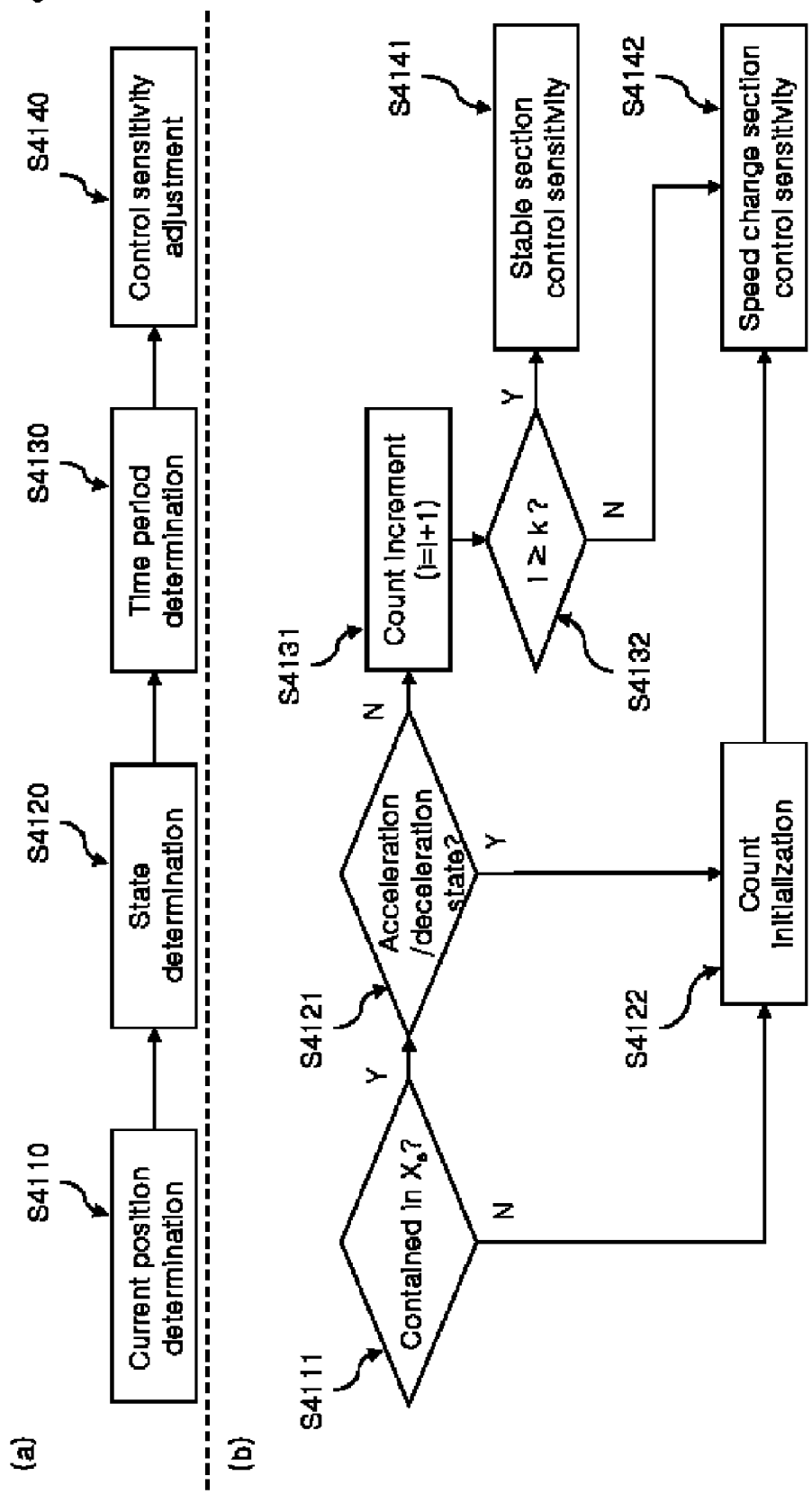
FIGS. 19 and 20 are flowcharts illustrating a sensitivity adjusting method performed by a sensitivity adjusting portion according to an exemplary embodiments of the present invention.
Figure 20:
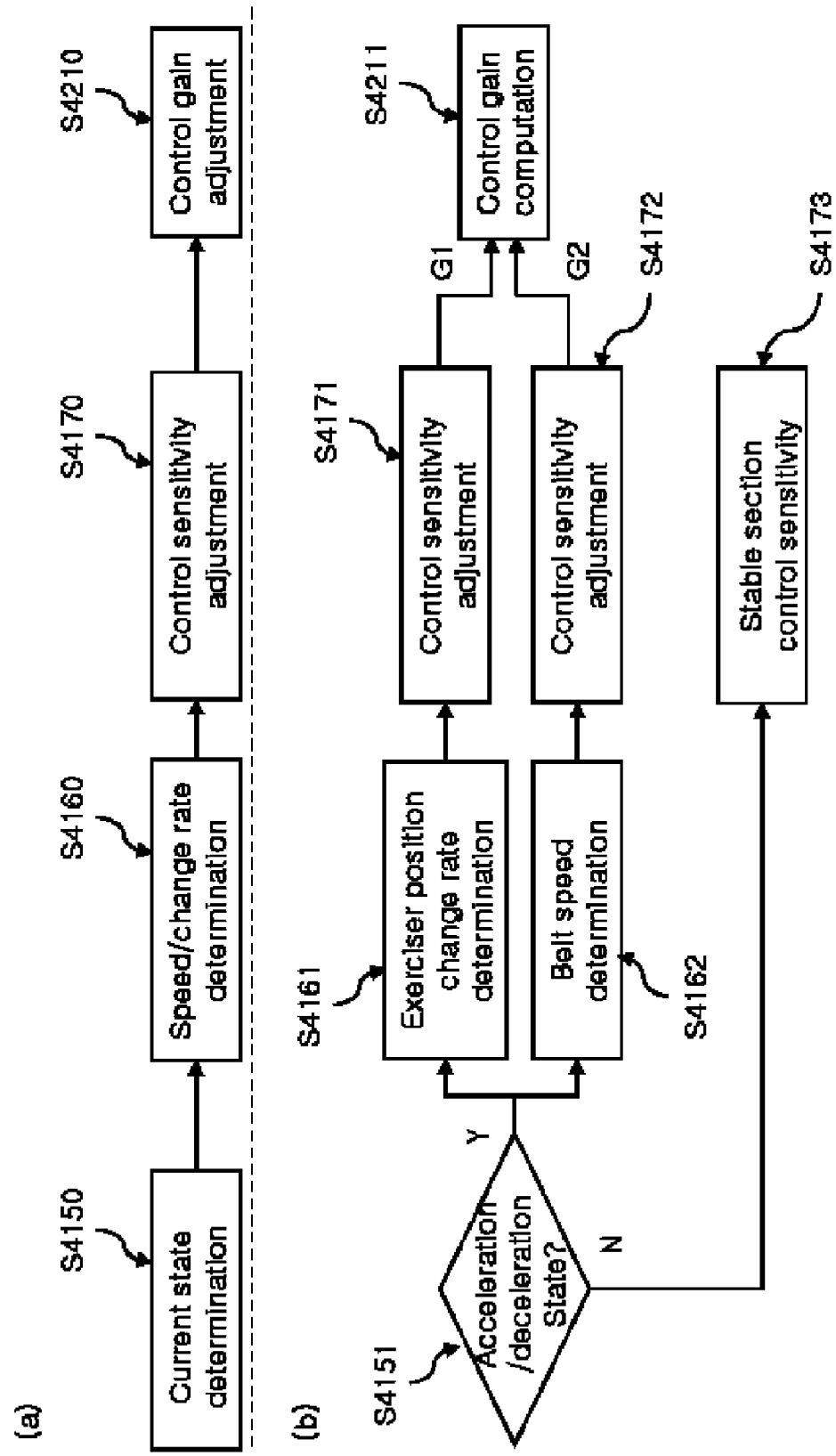

FIGS. 19 and 20 are flowcharts illustrating an operation of the sensitivity adjusting portion according to the exemplary embodiment of the present invention.

A control sensitivity which will be described below is computed based on a difference value between the reference position value and the data value and means a sensitivity of a control gain for generating the control signal. When a control sensitivity is large, a control gain is larger, compared to when a control sensitivity is small.

That is, the control sensitivity means a response degree to the control gain output by using the difference value as an input variable.

An expression that the control sensitivity is large, high or sensitive means that the response degree of the control gain which is a result of the difference value as an input variable is large. An expression that the control sensitivity is small, low or insensitive means that the response degree of the control gain which is a result of the difference value as an input variable is small.

FIG. 19 is a flowchart illustrating a sensitivity adjusting method performed by the sensitivity adjusting portion according to the exemplary embodiment of the present invention. The sensitivity adjusting method of FIG. 19 includes a current position determining step S4110 for determining whether the exerciser 1000 is located in a stable section $X_s$ or not, a state determining step S4120 for determining a current state of the exerciser 1000 corresponding to a current state value of the exerciser generated by the state determining portion 7110, a period determining step S4130 for determining whether the exerciser 1000 stays in the stable section $X_s$ during a predetermined time period or not, and a control sensitivity adjusting step S4140 for adjusting a control sensitivity when the exerciser 1000 stays in the stable section $X_s$ during a predetermined time period.

The stable section $X_s$ represents a predetermined area range containing the reference position value $X_o$. When the measured value $X_r$ or the converted value $X_r'$ corresponding to the position of the exerciser 1000 is in a range of the stable section $X_s$, the control sensitivity is lowered or the previous first control signal is not changed so that the exerciser 1000 can maintain the speed.

In the current position determining step S4110, it is determined whether or not the current value $X_r^T$ corresponding to the current position of the exerciser 1000 is in a range of the stable section $X_s$ containing a predetermined area range (step S4111). If the current value $X_r^T$ is in a range of the stable section $X_s$ the procedure goes to the state determining step S4120, whereas if the current value $X_r^T$ is not in a range of the stable section $X_s$, a count is initialized (in the exemplary embodiment of the present invention, an initial count is "zero") (step S4122), and then the procedure goes to the speed change section control sensitivity applying step S4142 which will be described in detail with reference to FIG. 20 and/or Equation 3.

In the state determining step S4120, the current state value $S_r$ of the exerciser determined by performing the state determining method of FIG. 14 is received from the state determining portion 7110 or the data storing portion 7130 of the pre-processing portion 7100, and it is determined whether the current state $S_r$ is an accelerating state or a decelerating state.

At this time, if the current state value $S_r$ is either of an accelerating state and a decelerating state (step S4122), the count is reset (i=0), and then the speed change section control sensitivity adjusting step S4142 which will be described with reference to FIG. 20 and/or Equation 3 is performed. If the current state value $S_r$ is neither of an accelerating state and a decelerating state, the period determining step S4130 is performed.

In the period determining step S4130, a count (i) with a predetermined initial value is increased by one (1) (i=i+1) (step S4131), and it is determined whether the count is equal to or greater than a predetermined reference (k) or not (step S4132). If the count is equal to or greater than the predetermined reference (k), a stable section control sensitivity applying step S4141 is performed to apply a stable section control sensitivity as a control sensitivity of the control gain portion 7310, whereas if the count is smaller than the predetermined reference (k), a speed change section control sensitivity applying step S4142 which will be described with reference to FIG. 20 and/or Equation 3 is performed. Preferably, "zero" is used as an initial value of the count (i).

In the stable section control sensitivity applying step S4141 of the control sensitivity adjusting step S4140, a control constant in a control equation of the control gain portion 7310 is adjusted to lower the control sensitivity, so that a speed change sensitivity of the belt with respect to a position change of the exerciser 1000 is lowered, satisfying a speed maintaining intend of the exerciser 1000.

In the exemplary embodiment of the present invention, the reference (k) used in the step S4131 for determining whether the count (i) is equal to or greater than the predetermined reference (k) is set to five (5). That is, when the current value $X_r^T$ exists in the stable section $X_s$ equal to or more than five (5) times, it is determined as the speed maintaining intend of the exerciser 1000, so that the control constant is adjusted to lower the control sensitivity.

A relationship between the control constant and the control sensitivity and a method for adjusting the control sensitivity to adjust the control sensitivity will be explained later with reference to Equation 3.

FIG. 20 is a flowchart illustrating a control sensitivity adjusting method according to the exemplary embodiment of the present invention. The control sensitivity adjusting method of FIG. 20 includes a current state determining step S4150 for determining whether the current state is an accelerating state or a decelerating state, a speed/change rate determining step S4160 for determining a driving speed containing a belt speed or a corresponding speed thereto or an exerciser position change rate, and a control sensitivity adjusting step S4160 for adjusting a control sensitivity according to the determined speed/change rate. The control sensitivity adjusting method of FIG. 20 may further include a control gain adjusting step S4210 for computing a control gain obtained by a control equation that a control sensitivity is adjusted and finally adjusting a control gain.

In the current state determining step S4150, it is determined whether or not the current state value $S_r$ generated in the state determining portion 7110 is a value corresponding to either of an accelerating state and a decelerating state (step S4151). If the current state is either of an accelerating state and a decelerating state, the speed/change rate determining step S4160 is performed, whereas if the current state is neither of an accelerating state and a decelerating state, the control sensitivity is adjusted in a stable section control sensitivity applying step S4173 corresponding to a stable section which is described with reference to FIG. 19 and Equation 3.

The speed/change rate determining step S4160 includes two steps. One is an exerciser position change rate determining step S4161 for determining a change rate per unit time of the measure value $X_{r-i}$ (i=0, ..., n) or the converted values $X_{r-i}'$ (i=0, ..., n), and the other is a driving speed determining step S4162.

The exerciser position change rate determining step S4161 is to determine an accelerating or decelerating trend of the exerciser 1000. A change rate per unit of the converted values $X_{r-i}'$ (i=0, ..., n) is determined to determine a forward or backward speed.

The exerciser can change position by accelerating or decelerating independently from the driving speed.

That is, if the exerciser 1000 intends to accelerate from a current speed, the current value $X_r^T$ gets smaller than the past value $X_{r-1}^T$, whereas if the exerciser 1000 intends to decelerate from a current speed, the current value $X_r^T$ gets greater than the past value $X_{r-1}^T$.

The exerciser position change rate determining step S4161 is a step for determining a degree which the exerciser 1000 intends to accelerate or decelerate from the current speed, and it is understood that if a change rate per unit time is large, then the exerciser intends to accelerate or decelerate quickly.

If the position change rate per unit time of the exerciser 1000 is large, the control sensitivity is increased by adjusting, i.e., increasing the control constant, and if the position change rate per unit time of the exerciser 1000 is small, then the control sensitivity is decreased by adjusting, i.e., decreasing the control constant, whereby it is possible to rapidly follow an accelerating or decelerating intention of the exerciser 1000.

The belt speed determining step S4162 is used to determine an actual driving speed. A method for computing the driving speed is similar to the method described in the reference position generating step S3000 of FIG. 17.

If the driving speed is high, that is, if the belt speed is fast, the control sensitivity is increased, and if the driving speed is slow, that is, if the belt speed is low, the control sensitivity is decreased.

If the exerciser 1000 exercising at a high speed intends to decelerate, then the control sensitivity is increased since the exerciser 1000 may face risk if a deceleration is slow.

To the contrary, if the exerciser 1000 exercising at a low speed intends to decelerate, the control sensitivity is decreased since the exerciser 1000 may feel uncomfortable or face risk if a deceleration is fast.

Referring to the target decelerations 210 and 220 of FIG. 1, it is understood that the target deceleration is low if the driving speed is slow, and the target deceleration is high if the driving speed is fast.

In the control sensitivity adjusting step S4170, the control sensitivity is adjusted as follow, based on the determination in the speed/change rate determining step S4160.

A control gain G1 is computed by adjusting the control sensitivity such that if it is determined in the exerciser position change rate determining step S4161 that a position change rate of the exerciser 1000, i.e., a backward speed of the exerciser 1000, is large, then the control constant is increased to increase the deceleration of the belt. If it is determined that it is small, then the control constant is decreased (step S4162). A control gain G2 is computed by adjusting the control sensitivity such that if it is determined in the belt speed determining step S4162 that if the driving speed is fast, then the control constant is increased, and if the driving speed is slow, then the control constant is decreased.

In the control gain adjusting step S4210, an operation on the two or more control gains G1 and G2 which are obtained in an accelerating state or a decelerating state or are obtained by adjusting the control sensitivities by determinations according to various exemplary embodiments of the present invention may be performed to thereby generate a final control gain ΔV.

In the exemplary embodiment of the present invention, the control gains are weight-averaged to generate the final control gain ΔV.

Another exemplary embodiment of the present invention to adjust the control sensitivity is described below.

If the exerciser 1000 desires to reduce an acceleration or to decelerate in an accelerating state, the current value $X_r^T$ which represents a current position of the exerciser 1000 has a larger value than the past value $X_{r-1}^T$, but it still has a smaller value than the reference position value $X_0$, and so the belt is accelerated contrary to the decelerating intention of the exerciser 100.

The exemplary embodiment of the present invention to overcome the above-described problem is described below in detail with reference to Equations.

Equation 1 can be expressed by a per unit time as follows:

$$\Delta V_{r-1} = K_p \times \Delta X_{r-1} + K_i \times \sum_{t=0}^{r-1} \Delta X_t \Delta t \quad \text{[Equation 1a]}$$

$$\Delta V_r = K_p \times \Delta X_r + K_i \times \sum_{t=0}^{r} \Delta X_t \Delta t \quad \text{[Equation 1b]}$$

Equation 1a is a control equation which corresponds to an immediately previous unit time (j=r−1) based on a current time (j=r), and Equation 1b is a control equation which corresponds to the current time (j=r).

Equation 3 is obtained by allying Equations 1a and 1b.

$$\Delta V_r = \Delta V_{r-1} = K_p \times (X_{r-1}' = X_r') + K_i \times \Delta X_r \times \Delta t \quad \text{[Equation 3]}$$

As can be seen by Equation 3, in case where the exerciser 1000 desires to reduce an acceleration or to decelerate in an accelerating state, in a large-small relationship of variables on a right side of Equation 3, the past value $X_{r-1}^T$ is smaller than the current value $X_r^T$, and the current value $X_r^T$ is smaller than the reference position value $X_0$.

In this instance, the exerciser 1000's intention is to reduce an acceleration or to decelerate. Therefore, since a current acceleration should be smaller than a past acceleration, a value obtained by subtracting the past speed change amount, i.e., a past acceleration $\Delta V_{r-1}$ from the current speed change amount, i.e., a current acceleration $\Delta V_r$ should be a negative value, and so a left side of Equation 3 should be a negative number.

However, since a value obtained by subtracting the current value $X_r^T$ from the reference position value $X_0$ is a positive number, and a value obtained by subtracting the current value $X_r^T$ from the past value $X_{r-1}^T$ is a negative number, if the proportional constant $K_p$ and the integral constant $K_i$ which are the control constants multiplied to them are fixed values, particularly, if a value of the integral constant $K_i$ is large, the right side becomes a positive number. This produces a problem in that an acceleration is increased regardless of the exerciser's intention for reducing an acceleration or decelerating.

For the foregoing reasons, in the exemplary embodiment of the present invention, the control constants are independently controlled.

When the exerciser 1000 moves back in an accelerating state, that is, when the current value $X_r^T$ corresponding to a position of the exerciser 1000 gets greater than the past value $X_{r-1}^T$, it is possible to decrease the integral constant $K_i$ which is a control constant of a portion for determining an absolute position of the exerciser 1000 or to increase the proportional constant $K_p$ which is a control constant of a portion for determining a position change rate per unit time of the exerciser 1000 until a position of the exerciser 1000 is ahead of the reference position with respect to the exerciser detecting portion 3000, that is, the current value $X_r^T$ is smaller than the reference position value $X_0$.

In the exemplary embodiment of the present invention, the integral constant $K_i$ is adjusted without adjusting the proportional constant $K_p$, but it is possible to realize various modifications, for example, to increase the proportional constant $K_p$ and to reduce the integral constant $K_i$.

Similarly, even when the exerciser 1000 desires to reduce a deceleration in a decelerating state or to accelerate, the same phenomenon occurs, and so it is preferred to independently adjust the control constants.

In case where the exerciser 1000 desires to reduce a deceleration in a decelerating state or to accelerate, in a large-small relationship of variables on the right side of Equation 3, the past value $X_{r-1}^T$ is greater than the current value $X_r^T$, and the current value $X_r^T$ is greater than the reference position value $X_0$.

In this instance, since the exerciser 1000's intention is to reduce a deceleration or to accelerate, a current deceleration should be smaller than a past deceleration. Therefore, a value obtained by subtracting the past speed change amount, i.e., a past deceleration $\Delta V_{r-1}$ from the current speed change amount, i.e., a current deceleration $\Delta V_r$ should be a positive value, and so the left side of Equation 3 should be a positive number.

However, since a value obtained by subtracting the current value $X_r^T$ from the reference position value $X_0$ is a negative number, and a value obtained by subtracting the current value $X_r^T$ from the past value $X_{r-1}^T$ is a positive value, if the proportional constant $K_p$ and the integral constant $K_i$ which are the control constants multiplied to them are fixed values, particularly, if a value of the integral constant $K_i$ is large, then the right side becomes a negative number. Thus, hat there occurs a problem in that a deceleration is increased regardless of the exerciser's intention for reducing a deceleration or accelerating.

When the exerciser 1000 moves forward in a decelerating state, that is, when the current value $X_r^T$ corresponding to a position of the exerciser 1000 gets smaller than the past value $X_{r-1}^T$, it is possible to decrease the integral constant $K_i$ which is a control constant of a portion for determining an absolute position of the exerciser 1000 or to increase the proportional constant $K_p$ which is a control constant of a portion for determining a position change rate per unit time of the exerciser 1000 until a position of the exerciser 1000 is behind the reference position with respect to the exerciser detecting portion 3000, that is, the current value $X_r^T$ is greater than the reference position value $X_0$.

In the exemplary embodiment of the present invention, the integral constant $K_i$ is adjusted without adjusting the proportional constant $K_p$, but it is possible to realize various modifications, for example, to increase the proportional constant $K_p$ and to reduce the integral constant $K_i$.

Figure 21:
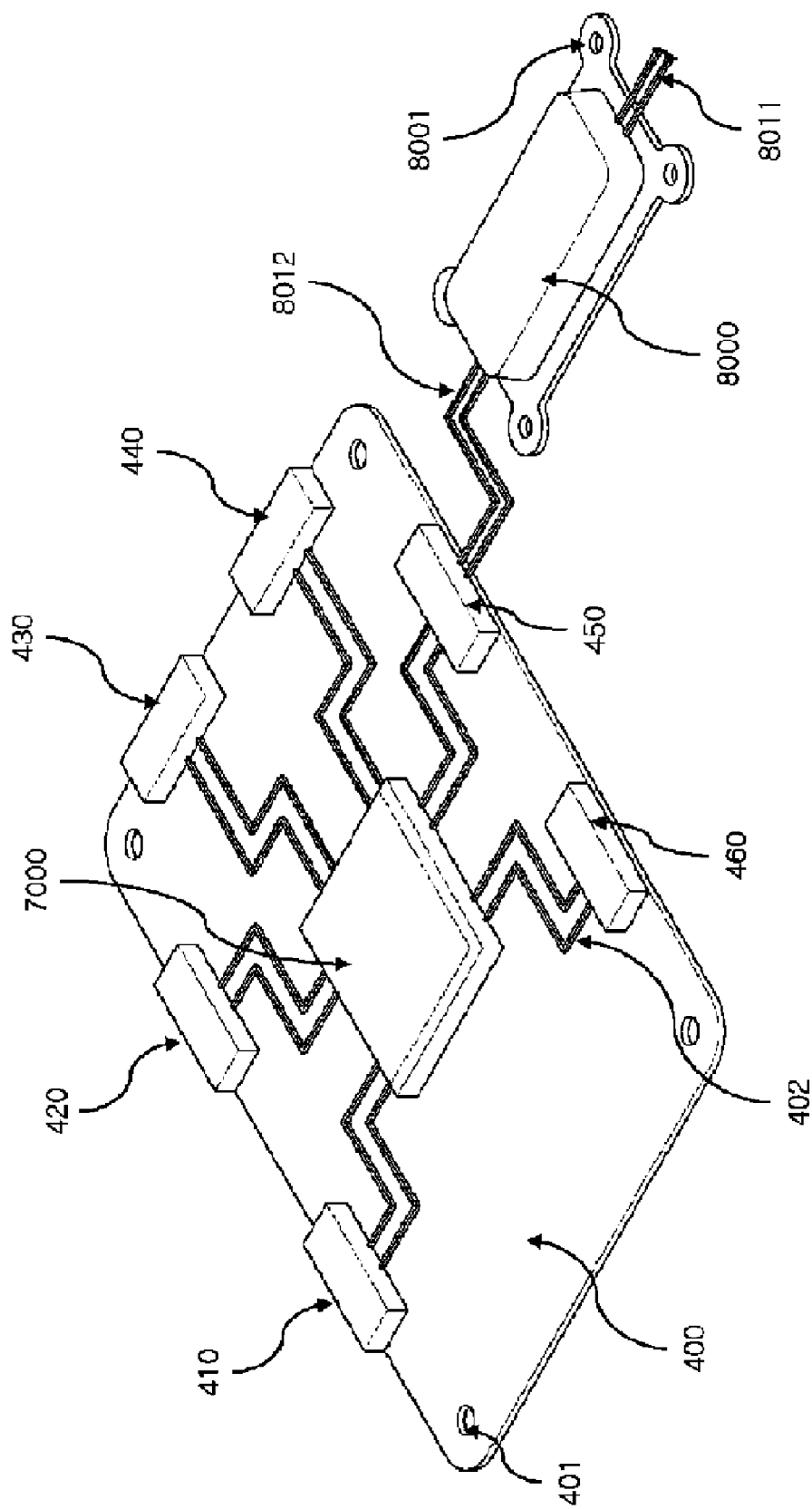
FIG. 21 is a perspective view illustrating a control module for the treadmill with the automatic speed control function according to an exemplary embodiment of the present invention.

FIG. 21 is a perspective view illustrating a control module for the treadmill with the automatic speed control function according to the exemplary embodiment of the present invention. The control module of FIG. 21 includes the control portion 7000 mounted on a base substrate 400 containing a printed circuit board (PCB).

A control system for the treadmill with the automatic speed control function may be realized such that an electrical braking portion 8000 is eclectically connected to the base substrate 400 containing the control portion 7000.

The control module for the treadmill with the automatic speed control function which has the base substrate 4000 further includes connecting terminals 410, 420, 430, 440, 450, and 460 which are electrically connected, respectively, with respective components of the treadmill according to the exemplary embodiment of the present invention.

The control module for the treadmill according to the exemplary embodiment of the present invention uses a PCB as the base substrate 4000, and the base substrate 4000 includes the control portion 7000 which comprises semiconductor circuits and electrical wire lines 402 which electrically connect the control portion 7000 and the connecting terminals 410, 420, 430, 440, 450, and 460.

The base substrate 400 further includes coupling holes 401 through which the base substrate 400 is coupled to a predetermined area of the body portion 2100 of the treadmill.

An exerciser detecting portion connecting terminal 410 serves to transmit, to the control portion 7000, a signal corresponding to a position of the exerciser measured by the exerciser detecting portion 3000 or the measured value.

An operating portion connecting terminal 420 serves to transmit a signal corresponding to a manipulating button selected by the exerciser to the control portion 7000 from the operating portion 2210 with the manipulating button.

A display connecting terminal 430 serves to transmit, to the display device 2220, a signal corresponding to display information which is processed by the control portion 7000 to be provided to the exerciser and/or to transmit, to the control portion 7000, a signal corresponding to a manipulation of the exerciser on a touch screen or a touch pad arranged in the display device 2220.

A power supply portion connecting terminal 440 serves to transmit electrical power supplied from the power supply portion 2500 to the control portion 7000 to drive the semiconductor circuits in the control portion 7000.

An electrical braking portion connecting terminal 450 serves to transmit the second control signal to the electrical braking portion 8000 when the switching portion 8100 in the electrical braking portion 8000 is desired to be controlled by the second control signal transmitted from the control portion 7000 as shown in FIGS. 3 to 9.

A motor driving portion connecting terminal 460 serves to transmit the first control signal to the motor driving portion 6000 from the control portion 7000 in order to control a speed of the driving motor.

Even though not shown, the base substrate 400 may further comprise a connecting terminal for transmitting a signal for detecting a driving speed containing a speed of the belt 5000 or a corresponding speed thereto.

In the exemplary embodiment of the present invention, a braking resistor is used as the electrical braking portion 8000, and a heat sink portion which is made of a metal such as aluminum to discharge a heat generated in the braking resistor is also arranged.

The electrical braking portion 8000 further includes a driving portion connecting line 8011 which is connected to the motor driving portion 6000 to transfer regenerative energy flowing into the motor driving portion 6000 to the electrical braking portion 8000 and/or a control connecting line 8012 for receiving the second control signal transmitted from the control portion 7000.

Electrical braking portion coupling holes 401 for coupling the electrical braking portion 8000 to a predetermined area of the treadmill body portion 2100 are also arranged.

Here, if the electrical braking portion 8000 serves as a regenerative energy processing portion in which the regenerative energy generated in the driving motor 4000 when the electrical braking portion 8000 brakes the driving motor 4000 is discharged or consumed, the electrical braking portion 8000 can be called the regenerative energy processing portion, and the electrical braking portion connecting terminal and the electrical braking portion coupling hole can be called a regenerative energy processing portion connecting terminal and a regenerative energy processing portion coupling hole, respectively.

In the exemplary embodiment of the present invention, the electrical braking portion 800 may be arranged on the base substrate 400, and if a circuit for a regenerative braking is used as the electrical braking portion 8000 instead of the braking resistor, an electronic circuit may be arranged instead of the heat sink portion for discharging heat.

That is, the control module may be modified in configuration and form, depending on a configuration and form of the electrical braking portion 8000.

A parallel port or a serial portion may be used as the connecting terminals described above, and a configuration and form of the connecting terminals may be modified depending on various modifications of the exemplary embodiment of the present invention.

What is claimed is:

1. A treadmill, comprising:
   a body having a belt for supporting an exerciser; an exerciser detecting portion installed in a predetermined area of the body to detect movement of the exerciser;
   a driving motor coupled to the body to drive the belt;
   a control portion for generating a first control signal for adjusting a rotation speed of the driving motor based on a signal received from the exerciser detecting portion;
   a motor driving portion for adjusting the rotation speed of the driving motor according to the first control signal received from the control portion; and
   an electrical braking portion for reducing the rotation speed of the driving motor, wherein the electrical braking portion comprises a switching portion which operates when a voltage of regenerative energy flowing into the motor driving portion from the driving motor is equal to or more than a predetermined reference, when the rotation speed of the driving motor is decreased.

2. The treadmill of claim 1, wherein the switching portion operates by a second control signal transmitted from the control portion.

3. A treadmill, comprising: a body having a belt for supporting an exerciser;
   an exerciser detecting portion installed in predetermined area of the body to detect movement of the exerciser;
   a driving motor coupled to the body to drive the belt;
   a control portion for generating a first control signal for adjusting a rotation speed of the driving motor based on a signal received from the exerciser detecting portion;
   a motor driving portion for adjusting the rotation speed of the driving motor according to the first control signal received from the control portion; and
   an electrical braking portion for reducing the rotation speed of the driving motor, wherein the electrical braking portion comprises a braking resistor which converts regenerative energy flowing into the motor driving portion from the driving motor into heat in case of decreasing the rotation speed of the driving motor.

4. The treadmill of claim 3, wherein both ends of the braking resistor are electrically connected to both output terminals of the converting portion of the motor driving portion, respectively.

5. The treadmill of claim 4, wherein one end of the braking resistor is electrically connected to one end of a switching portion which operates when a voltage of the regenerative energy is equal to or more than a predetermined reference.

6. A treadmill, comprising:
   a body having a belt for supporting an exerciser;
   an exerciser detecting portion installed in a predetermined area of the body to detect movement of the exerciser;
   a driving motor coupled to the body to drive the belt;
   a control portion for generating a first control signal for adjusting a rotation speed of the driving motor based on a signal received from the exerciser detecting portion;
   a motor driving portion for adjusting the rotation speed of the driving motor according to the first control signal received from the control portion; and
   an electrical braking portion for reducing the rotation speed of the driving motor, wherein the electrical braking portion transfers at least a part of regenerative energy flowing into the motor driving portion from the driving motor to a power supplying portion for supplying electrical power to the motor driving portion, when the rotation speed of the driving motor is decreased.

7. The treadmill of claim 6, wherein the electrical braking portion comprises a switching portion which operates when a voltage of the regenerative energy is equal to or more than a predetermined reference.

* * * * *